(12) United States Patent
Nakamura et al.

(10) Patent No.: US 12,020,569 B2
(45) Date of Patent: Jun. 25, 2024

(54) STOP LOCATION CONTROL METHOD, STOP LOCATION CONTROL DEVICE, AND STOP LOCATION CONTROL SYSTEM

(71) Applicants: Nissan Motor Co., Ltd., Yokohama (JP); RENAULT S.A.S., Boulogne-Billancourt (FR)

(72) Inventors: Masahide Nakamura, Kanagawa (JP); Yutaka Mikuriya, Kanagawa (JP); Yoshitaka Takagi, Kanagawa (JP); Eijo Iwasaki, Kanagawa (JP); Narihiro Akari, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 13 days.

(21) Appl. No.: 17/995,482

(22) PCT Filed: Apr. 24, 2020

(86) PCT No.: PCT/IB2020/000406
§ 371 (c)(1),
(2) Date: Oct. 5, 2022

(87) PCT Pub. No.: WO2021/214505
PCT Pub. Date: Oct. 28, 2021

(65) Prior Publication Data
US 2023/0196916 A1 Jun. 22, 2023

(51) Int. Cl.
*G08G 1/123* (2006.01)
*G06Q 10/02* (2012.01)
*G08G 1/00* (2006.01)

(52) U.S. Cl.
CPC ............. *G08G 1/123* (2013.01); *G06Q 10/02* (2013.01); *G08G 1/202* (2013.01)

(58) Field of Classification Search
CPC .......... G08G 1/123; G08G 1/20; G08G 1/202; G06Q 10/02; G06Q 10/063
See application file for complete search history.

(56) References Cited

U.S. PATENT DOCUMENTS

| | | | |
|---|---|---|---|
| 11,227,238 B2* | 1/2022 | Hirose | G06Q 10/02 |
| 11,663,532 B2* | 5/2023 | Shimodaira | G08G 1/123 |
| | | | 701/411 |
| 11,670,174 B2* | 6/2023 | Mikuriya | H04L 67/52 |
| | | | 340/988 |

FOREIGN PATENT DOCUMENTS

| | | |
|---|---|---|
| JP | 2009-190560 A | 8/2009 |
| JP | 2015-176468 A | 10/2015 |

(Continued)

*Primary Examiner* — John A Tweel, Jr.
(74) *Attorney, Agent, or Firm* — Global IP Counselors, LLP

(57) ABSTRACT

A controller includes an extraction unit, an arrival time calculation unit, a departure time calculation unit, a stop location calculation unit and a transmission unit. The extraction unit extracts stop-scheduled vehicles, which are scheduled to stop in a stopping area. The arrival time calculation unit calculates arrival times when the stop-scheduled vehicles will arrive at the stopping area based at least on user-side information of users who use the stop-scheduled vehicles, or on position information of the stop-scheduled vehicles. The departure time calculation unit calculates a scheduled departure order indicating an order in which the stop-scheduled vehicles will depart the stopping area. The stop location calculation unit calculates stop locations of the stop-scheduled vehicles based on the scheduled departure order. The transmission unit transmits information indicating the stop locations to the stop-scheduled vehicles.

14 Claims, 17 Drawing Sheets

(56) References Cited

FOREIGN PATENT DOCUMENTS

| JP | 2015-219811 A | 12/2015 |
| WO | 2019/113426 A1 | 6/2019 |

* cited by examiner

STOP LOCATION CONTROL METHOD, STOP LOCATION CONTROL DEVICE, AND STOP LOCATION CONTROL SYSTEM

CROSS-REFERENCE TO RELATED APPLICATIONS

This application is a U.S. national stage application of International Application No. PCT/IB2020/000406, filed on Apr. 24, 2020.

BACKGROUND

Technical Field

The present invention relates to a vehicle stop location control method, a vehicle stop location control device, and a vehicle stop location control system.

Background Information

An invention that detects a parking space and assists a vehicle to park in the detected parking space is known from Japanese Laid-Open Patent Application No. 2009-190560 (Patent Document 1). In the method disclosed in Patent Document 1, obstacles in the parking space are detected, and a parking position is determined such that the detected obstacles will not hinder the boarding and deboarding of passengers and the opening/closing of the trunk.

SUMMARY

However, the method disclosed in Patent Document 1 takes obstacles into consideration, but not efficiency, in a stopping area (where a plurality of vehicles can stop). Therefore, the method described in Patent Document 1 may not be able to utilize the stopping area efficiently.

In view of the problem described above, an object of the present invention is to provide a stop location control method, a stop location control device, and a stop location control system that can utilize a stopping area efficiently.

A stop location control method according to one aspect of the present invention comprises acquiring location information from a plurality of vehicles; acquiring user-side information including location information of users who use the plurality of vehicles or reservation information pertaining to the vehicles reserved by the users; extracting, from among the plurality of vehicles, stop-scheduled vehicles, which are vehicles that are scheduled to stop in the stopping area; calculating arrival times when the stop-scheduled vehicles will arrive at the stopping area, based on the user-side information of the users who at least use the stop-scheduled vehicles or based on position information of the stop-scheduled vehicles; calculating a scheduled departure order indicating the order in which the stop-scheduled vehicles will depart the stopping area after stopping in the stopping area, based on the arrival times and times required for boarding and deboarding; calculating stop locations of the stop-scheduled vehicles based on the scheduled departure order; and transmitting information indicating the stop locations to the stop-scheduled vehicles.

By means of the present invention, it becomes possible to utilize a stopping area efficiently.

BRIEF DESCRIPTION OF THE DRAWINGS

Referring now to the attached drawings which form a part of this original disclosure.

DETAILED DESCRIPTION OF EMBODIMENTS

Figure 1:
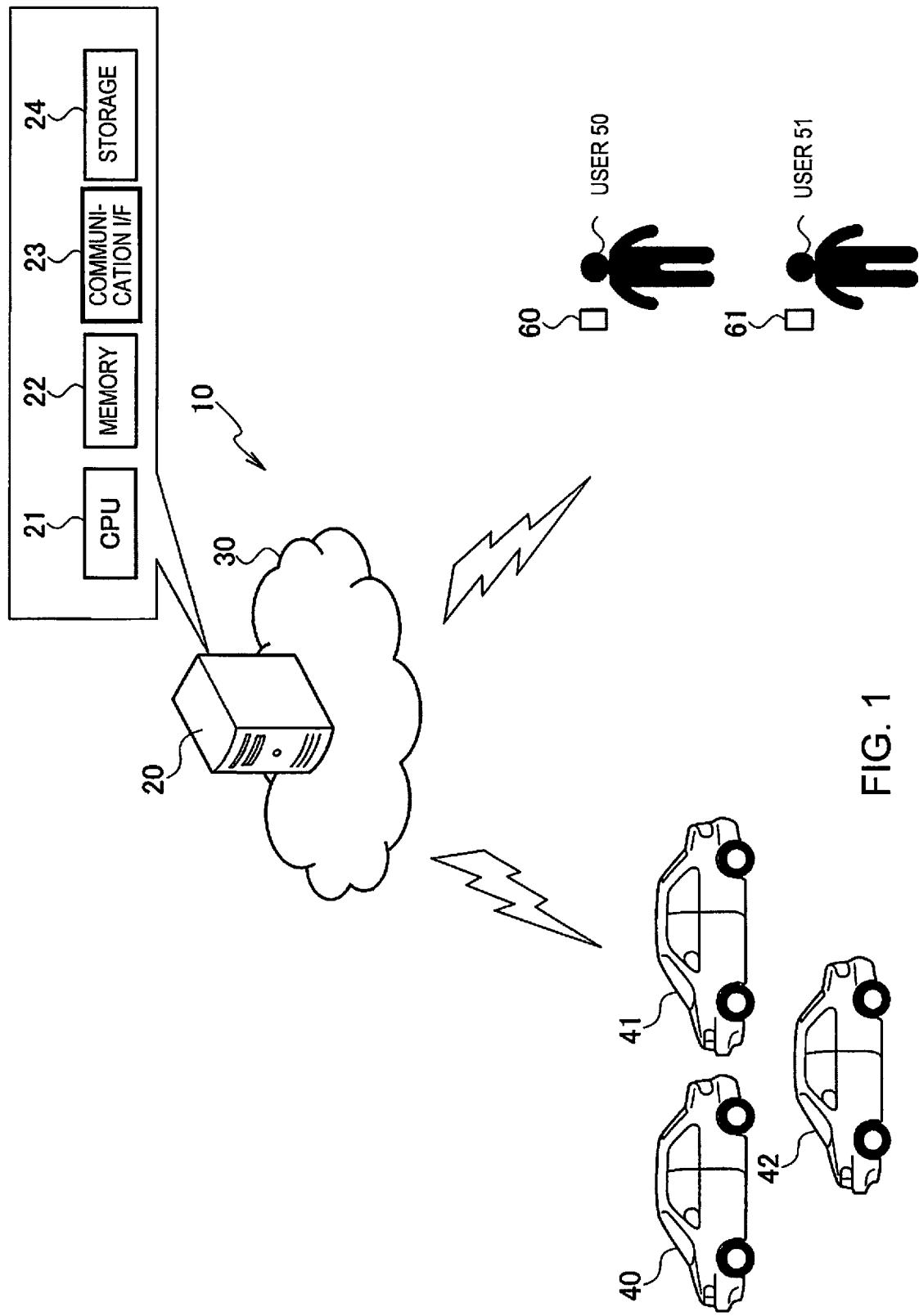
FIG. 1 is an overall schematic diagram of a stop location control system according to a first embodiment of the present invention.

Embodiments of the present invention are described below with reference to the figures. In the descriptions of the figures, identical parts have been assigned the same reference numerals, and their descriptions have been omitted.

First Embodiment

Configuration Example of Stop Location Control System

A configuration example of a stop location control system 10 according to a first embodiment will be described with reference to FIGS. 1-2. The stop location control system 10 according to the first embodiment dispatches a vehicle when a dispatch request from a user is received and calculates a stop location of the vehicle in a stopping area.

As shown in FIG. 1, the stop location control system 10 includes a controller 20, a communication network 30, vehicles 40 to 42, a user 50, a terminal device 60 in the possession of the user 50, a user 51, and a terminal device 61 in the possession of the user 51. In FIG. 1, there are three vehicles, but no limitation is implied thereby. The stop location control system 10 may include four or more vehicles. Moreover, in FIG. 1, there are two users, but there are numerous users who are not shown. The numerous users who are not shown, like the users 50 and 51, also possess terminal devices.

The controller 20 (stop location control device) communicates with the vehicles 40 to 42 and the terminal devices 60 to 61 via the communication network 30. The controller 20 comprises a CPU (Central Processing Unit) 21, a memory 22, a communication I/F 23, and a storage 24, and these constituent elements are electrically connected via a bus, etc., not shown in the figure. Although the installation location of the controller 20 is not particularly limited, the controller 20 is installed, for example, in a business that operates the vehicles 40 to 42.

The CPU 21 loads various programs stored in the storage 24, etc., into the memory 22, and executes various instructions contained in the programs. The memory 22 is a storage medium such as a ROM (Read Only Memory), RAM (Random Access Memory), etc. The storage 24 is a storage medium such as an HDD (Hard Disk Drive). Some (or all) of the stop location control system 10, including the functions of the controller 20, described below, may be provided by means of an application (Software as a Service (SaaS), etc.) located on the communication network 30. The controller 20 may be a server.

The communication I/F 23 is implemented as hardware, such as a network adapter, various types of communication software, or a combination thereof, and is configured to realize wired or wireless communication via the communication network 30, etc.

The communication network 30 may be configured by a wireless and/or wired method, and the communication network 30 may include the Internet. In the first embodiment, the controller 20, the vehicles 40 to 42, and the terminal devices 60 to 61 are connected to the communication network 30 by means of a wireless communication method.

The vehicles 40 to 42 may be vehicles with a driver, or autonomous driving vehicles without a driver. In the first embodiment, the vehicles 40 to 42 are described as autonomous driving vehicles without a driver. The vehicles 40 to 42 are, for example, taxis, although the vehicles are not limited to taxis.

If the use of private cars as taxis is permitted by law (and even if it is not permitted by current law, but will be permitted in the future after a revision of the law), the vehicles 40 to 42 may be private cars.

The user 50 requests (reserves) a vehicle using the terminal device 60. A vehicle dispatch application (hereinafter referred to simply as a vehicle dispatch app) used for reserving vehicles is installed in the terminal device 60, and the user 50 requests a vehicle using the vehicle dispatch app. The user 51 also requests a vehicle using the terminal device 61. This type of vehicle request may be referred to as a vehicle dispatch request.

Next, with reference to FIG. 2, details of the controller 20, the vehicle 40, and the terminal device 60 will be described. Although the vehicles 41 and 42 and the terminal device 61 have been omitted from FIG. 2, the vehicles 41 and 42 have the same configuration as the vehicle 40, and the terminal device 61 has the same configuration as the terminal device 60.

The terminal device 60 comprises a communication I/F 601 and a vehicle dispatch app 602. The communication I/F 601 has the same configuration as the communication I/F 23 and communicates with the controller 20 via the communication network 30. The terminal device 60 is, for example, a smartphone, a tablet, or the like. The terminal device 60 may also be a wearable device. The terminal device 61 (not shown) includes a vehicle dispatch app (not shown).

The vehicle dispatch app 602 is used for requesting a vehicle, as described above. The vehicle dispatch app 602 functions as a user interface when the user 50 requests a vehicle. The vehicle dispatch app 602 is realized by the CPU provided in the terminal device 60 reading and executing a dedicated application program from a storage provided in the terminal device 60. When the user 50 requests a vehicle, the user 50 inputs a desired boarding location, boarding time, deboarding location, etc., into the vehicle dispatch app 602 to request the vehicle. The vehicle dispatch app 602 transmits a dispatch request to the controller 20 in accordance with the input from the user 50. Further, the terminal device 60 displays, on a display provided in the terminal device 60, various types of information (dispatch request receipt, scheduled arrival time, scheduled travel route, etc.) included in the signal returned from the controller 20 in response to the dispatch request. However, the method of realizing the vehicle dispatch app 602 is not limited in this way. For example, the terminal device 60 may access a server that provides the functions of the vehicle dispatch app 602, receive the functions provided, and display the results of executing the functions transmitted from the server in a browser.

Further, the information input to the vehicle dispatch app 602 by the user 50 includes the number of people who will board, the presence/absence of luggage, the presence/absence of a wheelchair, and the like. The information pertaining to luggage includes the number of pieces and the size of the luggage.

Figure 2:
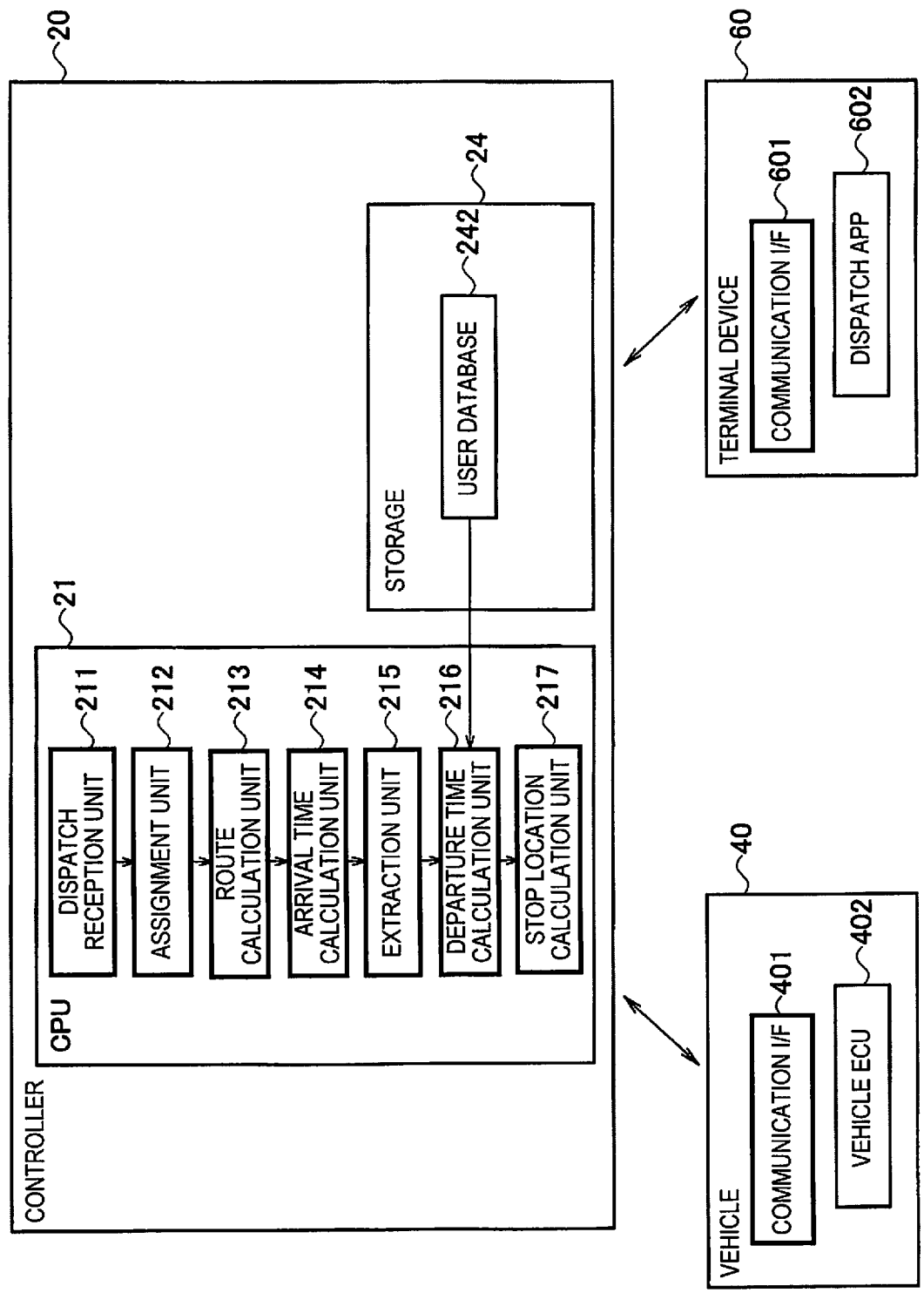
FIG. 2 is a functional block diagram of a controller, a vehicle, and a terminal device according to the first embodiment of the present invention.

As shown in the block diagram of FIG. 2, the CPU 21 of the controller 20 is provided with, as examples of a plurality of functions, a vehicle dispatch acceptance unit 211, an assignment unit 212, a route calculation unit 213, an arrival time calculation unit 214, an extraction unit 215, a departure time calculation unit 216, and a stop location calculation unit 217. As shown in the block diagram of FIG. 2, a user database 242 is stored in the storage 24 of the controller 20.

The vehicle dispatch acceptance unit 211 accepts a request from the user 50 via the terminal device 60. Further, the vehicle dispatch acceptance unit 211 has the function of notifying the terminal device 60 of the acceptance of the request from the user 50, as well as of the scheduled arrival time to the boarding location, the scheduled travel route to the boarding location, etc. Further, the vehicle dispatch acceptance unit 211 accepts a request from the user 51 via the terminal device 61.

The assignment unit 212 assigns a suitable vehicle from among the plurality of vehicles 40 to 42 based on the accepted dispatch request. For example, for reasons of efficiency, the assignment unit 212 can assign the unoccupied vehicle 40 that, of the plurality of vehicles 40 to 42, is closest to the boarding location desired by the user 50. Further, if the user 50 has specified a vehicle type, the assignment unit 212 assigns the specified vehicle type. GPS receivers are installed in the vehicles 40 to 42, and the location information of the vehicles 40 to 42 is transmitted to the controller 20 at any given time.

The route calculation unit 213 calculates a route from the current location of the vehicle 40 to the boarding location desired by the user 50 and sends an instruction to the vehicle 40 to travel to the boarding location desired by the user 50 via the calculated route. The route calculated by the route calculation unit 213 is, for example, the route via which the boarding location desired by the user 50 can be reached from the current location of the vehicle 40 in the shortest amount of time.

The arrival time calculation unit 214 calculates the time at which the vehicle 40 will arrive at the boarding location desired by the user 50. In other words, the arrival time calculation unit 214 calculates the time required to travel to the boarding location desired by the user 50 via the route calculated by the route calculation unit 213.

The extraction unit 215 extracts a vehicle scheduled to stop at a stopping area for boarding and deboarding the user 50 from among the vehicles 40 to 42. The extraction unit 215 refers to the reservation information of the user 50, and if the boarding location related to the dispatch request is set in the stopping area, the extraction unit 215 extracts the assigned vehicle as the vehicle scheduled to stop in the stopping area. In the following, a vehicle scheduled to stop in the stopping area may be referred to as a stop-scheduled vehicle.

The departure time calculation unit 216 refers to the reservation information of the users, the user database 242, etc., to calculate the times (scheduled departure times) that vehicles stopped in the stopping area will depart the stopping area. The departure time calculation unit 216 calculates the time required for boarding and deboarding, from the time that the user started to board and deboard until the time that the boarding and deboarding ended. The time required for boarding and deboarding is classified into the time required for boarding and the time required for deboarding. In the case that a user boards the vehicle in the stopping area, the scheduled departure time is calculated by adding the time required for boarding to the time at which the user arrives at the stopping area. The time required for boarding will be described. In general, boarding takes more time as the number of people boarding increases. Further, the greater the amount of luggage, such as suitcases, the longer it takes time to load the luggage, which increases the time required for boarding. Further, boarding takes longer when it is raining, as opposed to when it is sunny, since more movements are involved, such as closing an umbrella. Boarding also takes longer for a user using a wheelchair. Boarding also takes longer for a user using the vehicle for the first time, as opposed to a user who uses the vehicle frequently. The time required for deboarding will be described further below.

Information concerning the number of people boarding, luggage, and wheelchairs, etc., can be obtained by referring to the user reservation information. Vehicle usage history is obtained by referring to the user database 242. Weather information is obtained by referring to the Internet. The usage history stored in the user database 242 includes the user's movement speed, trend information regarding meeting with reserved vehicles, and the like.

In addition to the scheduled departure times, the departure time calculation unit 216 calculates a scheduled departure order that indicates the order in which vehicles will depart the stopping area after having stopped in the stopping area. The scheduled departure order is obtained by arranging the scheduled departure times in chronological order.

The stop location calculation unit 217 calculates the stop locations of vehicles in the stopping area based on the scheduled departure order calculated by the departure time calculation unit 216.

The vehicle 40 is equipped with a communication I/F 401 and a vehicle ECU (Electronic Control Unit) 402. The communication I/F 401 has the same configuration as the communication I/F 23 and the communication I/F 601, and communicates with the controller 20 via the communication network 30. The vehicle ECU 402 is a computer for controlling the vehicle 40. The vehicle ECU 402 controls various actuators (brake actuator, accelerator pedal actuator, steering actuator, etc.) based on the commands from the controller 20.

In the first embodiment, a stop means a temporary stop to allow the user to board and deboard a vehicle.

Next, an example of the stop location control method when there is one stop-scheduled vehicle will be described with reference to FIG. 3.

Figure 3:
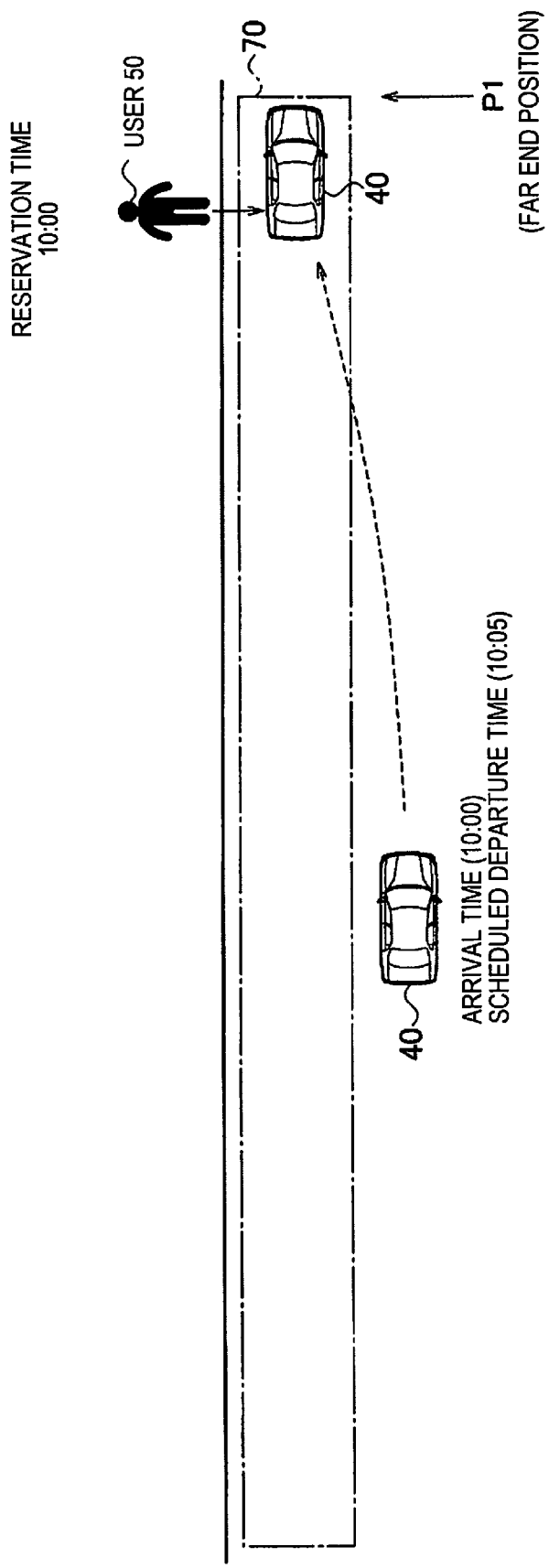
FIG. 3 is a diagram describing an example of the stop location control method according to the first embodiment of the present invention.

The scenario shown in FIG. 3 is one scenario in which the user 50 has reserved a vehicle using the vehicle dispatch app 602 and is waiting for the vehicle. It is assumed that the reservation time specified by the user 50 is 10:00, and that the boarding location specified by the user 50 is stopping area 70. The stopping area 70 is a boarding and deboarding location in which a plurality of vehicles can stop, such as a roundabout in front of a train station, a taxi zone at an airport, etc.

In FIG. 3, the vehicle assigned to the user 50 is the vehicle 40. The extraction unit 215 refers to the reservation information of the user 50 to extract the vehicle 40 scheduled to stop in the stopping area 70. Since the reservation information of the user 50 includes the boarding location, the extraction unit 215 can refer to the reservation information of the user 50 to extract a vehicle scheduled to stop in any stopping area (the stopping area 70 in the example shown in FIG. 3). The extraction timing is not particularly limited. The extraction unit 215 may extract the vehicle 40 scheduled to stop in the stopping area 70 when the assignment unit 212 assigns a vehicle. The extraction unit 215 may also extract the vehicle 40 as a vehicle scheduled to stop in the stopping area 70 before the vehicle 40 arrives at the stopping area 70. Before the vehicle 40 arrives at the stopping area 70 is, for example, when the vehicle 40 is traveling toward the stopping area 70.

In FIG. 3, it is assumed that only the vehicle 40 is extracted as a vehicle scheduled to stop in the stopping area 70. Further, it is assumed that are no other vehicles in the stopping area 70 besides the vehicle 40. It is assumed that the vehicle 40 was extracted before arriving at the stopping area 70.

Upon receiving the signal indicating that vehicle 40 has been extracted, the departure time calculation unit 216 calculates the scheduled departure time at which the vehicle 40 will depart the stopping area 70 after having stopped in the stopping area 70. The scheduled departure time is calculated by adding the time required for boarding to the time at which the user 50 arrives at the stopping area 70.

There is a plurality of methods for acquiring or estimating the time at which the user 50 will arrive at the stopping area 70. For example, the departure time calculation unit 216 may regard 10:00, which is the reservation time of the user 50, as the time at which the user 50 will arrive at the stopping area 70. This is because it is generally assumed that the user will arrive at the stopping area 70 at his or her specified reserved time. Alternatively, the departure time calculation unit 216 may acquire the location information of the terminal device 60 in possession of the user 50 in order to estimate, based on the acquired location information, the time at which the user 50 will arrive at the stopping area 70. The location information of the terminal device 60 in possession of the user 50 can be regarded as the location information of the user 50. The obtained location information of the user 50 and the walking speed (movement speed) of the user 50 can be combined in order to obtain the time at which the user 50 will arrive at the stopping area 70. Since the walking speed of the user 50 is stored in the user database 242, the departure time calculation unit 216 can refer to the user database 242 to acquire the walking speed of the user 50.

The departure time calculation unit 216 may also regard the time at which the vehicle 40 is to arrive at the stopping area 70 (arrival time) as the time at which the user 50 arrives at the stopping area 70. This is because the arrival time is calculated based on the reservation time of the user 50. As described above, the arrival time is calculated by the arrival time calculation unit 214. In FIG. 3, the arrival time was calculated as 10:00, and the vehicle 40 actually arrived at the stopping area 70 at 10:00.

In FIG. 3, the departure time calculation unit 216 estimated that the time at which the user 50 will arrive at the stopping area 70 is 10:00 (same as the reservation time).

The departure time calculation unit 216 refers to the reservation information of the user 50, the user database 242, etc., in order to calculate the time required for the user 50 to board. As described above, the time required for boarding is calculated based on such information as the number of people boarding, the amount of luggage, the presence of a wheelchair, etc. In FIG. 3, the time required for boarding is calculated to be 5 minutes. Therefore, by adding 5 minutes to 10:00, which is the arrival time of the user 50, the scheduled departure time is 10:05. The departure time calculation unit 216 also calculates the scheduled departure order. In FIG. 3, because there is one vehicle (only vehicle 40) scheduled to stop in the stopping area 70, the departure order of the vehicle 40 is first.

The stop location calculation unit 217 receives a signal indicating the scheduled departure order and calculates the stop location of the vehicle 40 based on the received signal. Since vehicle 40 is scheduled to depart first and there are no other vehicles, the stop location calculation unit 217 calculates a position P1 at the far end of the stopping area 70 as the stop location of the vehicle 40. The controller 20 transmits information indicating the stop location to the vehicle 40. Information indicating the stop location may be coordinate information (world coordinate system) or image information. Alternatively, the information indicating the stop location may be the coordinate position on an X axis, where the X axis is defined as the direction of travel of the vehicle. The vehicle 40 stops at the far end position P1 based on the received information.

Next, an example of the stop location control method when there are two stop-scheduled vehicles will be described with reference to FIG. 4.

Figure 4:
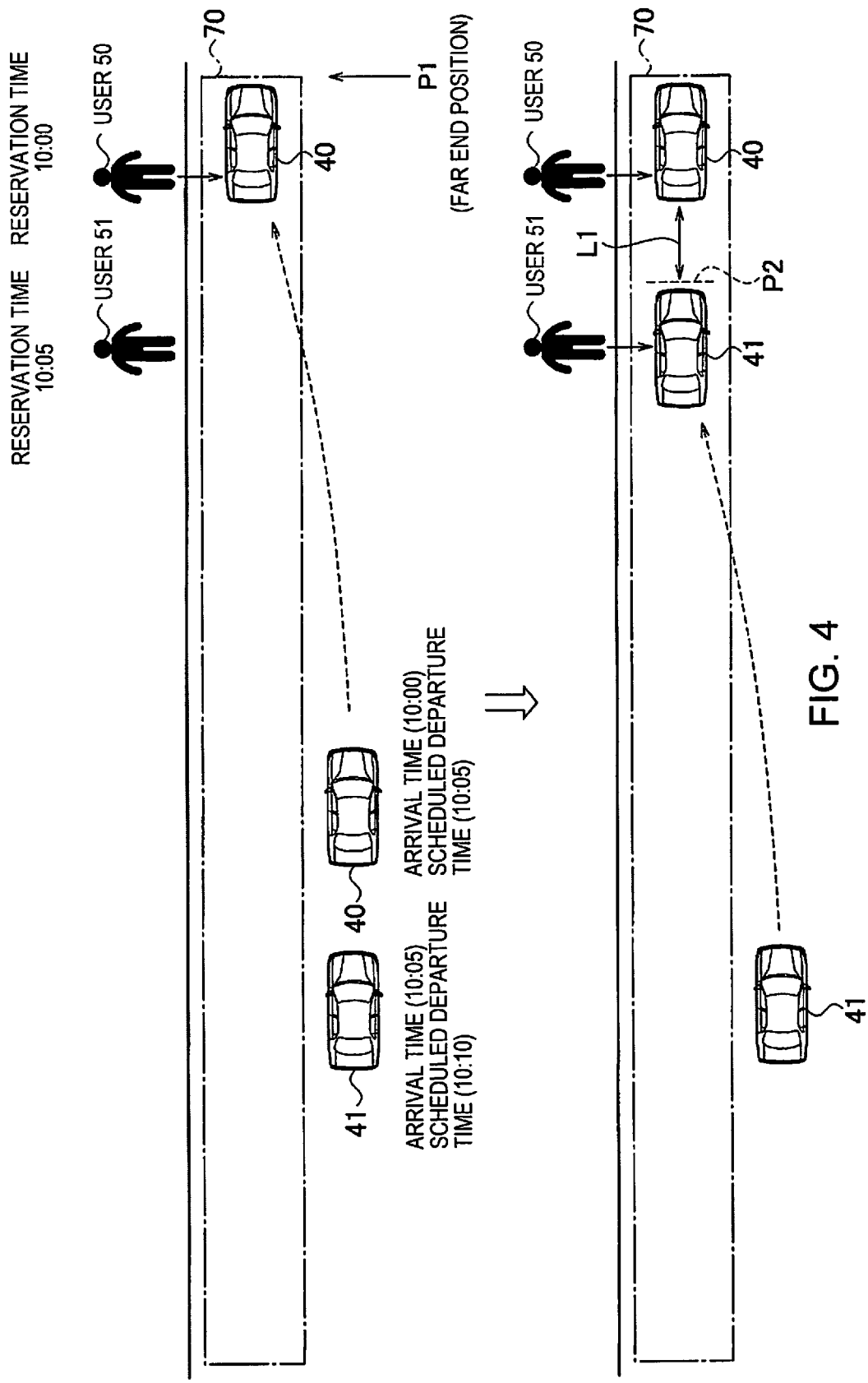
FIG. 4 is a diagram describing another example of the stop location control method according to the first embodiment of the present invention.

The user 50 in FIG. 4 is same as the one in FIG. 3. In other words, the user 50 has used the vehicle dispatch app to reserve a vehicle and is waiting for the vehicle. The reservation time specified by the user 50 is 10:00, and the boarding location specified by the user 50 is the stopping area 70.

FIG. 4 differs from FIG. 3 in the presence of the user 51. In FIG. 4, the user 51, like the user 50, has also used the vehicle dispatch app to reserve a vehicle and is waiting for the vehicle. The reservation time specified by the user 51 is 10:05, and the boarding location specified by the user 51 is the stopping area 70.

In FIG. 4, the vehicle assigned to the user 50 is the vehicle 40, and the vehicle assigned to the user 51 is the vehicle 41. Also, no other vehicles besides the vehicles 40 and 41 are present in the stopping area 70.

Upon receiving a signal indicating that the vehicles 40 and 41 have been extracted, the departure time calculation unit 216 calculates the scheduled departure times at which the vehicles 40 and 41 will depart the stopping area 70 after having stopped in the stopping area 70. The method of calculating the scheduled departure times is the same as that used in relation to FIG. 3. Some users may arrive at the stopping area 70 later than the reservation time or arrive at the stopping area 70 earlier than the reservation time. That is, calculating the scheduled departure order by taking only the reservation time into consideration may result in poor accuracy. Thus, in addition to the reservation time, the location information of the users 50 and 51 may also be considered. It is possible to accurately calculate the scheduled departure order, described further below. The departure time calculation unit 216 may also refer to the usage history (user database 242) of the users 50 and 51 to acquire the movement speeds of the users 50 and 51, or trend information regarding meeting the vehicles 40 and 41. Trend information regarding meeting the vehicles 40 and 41 is information indicating whether the user tends to arrive early or late to meet the vehicles. The departure time calculation unit 216 may calculate the scheduled departure order based on the acquired movement speeds or trend information. In this way, it is possible to calculate the scheduled departure order accurately.

In FIG. 4, the departure time calculation unit 216 has estimated that the time at which the user 50 will arrive at the stopping area 70 is 10:00 (the same as the reservation time). Further, the departure time calculation unit 216 has estimated that the time at which the user 51 will arrive at the stopping area 70 is 10:05 (the same as the reservation time).

The departure time calculation unit 216 refers to the reservation information of the users 50 and 51, the user database 242, etc., to calculate the times required for the users 50 and 51 to board. The method of calculating the time required for boarding is the same as that used in relation to FIG. 3. In FIG. 4, the time required for the user 50 to board is calculated to be 5 minutes. Therefore, by adding 5 minutes to 10:00, the scheduled departure time for the vehicle 40 is 10:05. The time required for the user 51 to board is also calculated to be 5 minutes. Thus, by adding 5 minutes to 10:05, the scheduled departure time of the vehicle 41 is 10:10.

The scheduled departure times are arranged in chronological order by the departure time calculation unit 216 in order to calculate the scheduled departure order. In FIG. 4, the vehicle 40 is scheduled to depart first, and the vehicle 41 is scheduled to depart second. That is, the scheduled departure order is vehicle 40, then vehicle 41. In FIG. 4, the vehicles will depart in the order of their arrival at the stopping area 70.

The stop location calculation unit 217 receives a signal indicating the scheduled departure order and calculates the stop location of the vehicle 40 and 41 based on the received signal. Since the scheduled departure order of the vehicle 40 is first and there are no other vehicles, the stop location calculation unit 217 calculates the far end position P1 of the stopping area 70 as the stop location of the vehicle 40.

Further, since the scheduled departure order of the vehicle 41 is second, the stop location calculation unit 217 calculates the stop location such that the stop location of the vehicle 41 is behind the vehicle 40. For example, the stop location calculation unit 217 can calculate a position P2, which is separated from the vehicle 40 by a distance L1, as the stop location. The distance L1 may be any distance that allows the vehicle 41 to depart while avoiding the vehicle 40 and is calculated using the dimensions of the vehicle 41. The dimensions of the vehicle 41 include the total length of the vehicle 41, the turning radius of the vehicle 41, the center-to-center distance between the front and rear wheels of the vehicle 41, etc. Further, the distance L1 may be a distance that allows use of a rear opening/closing mechanism of the vehicle 40. A rear opening/closing mechanism of the vehicle includes the trunk, a rear door, etc. The distance L1 may be any distance that allows the user 50 to safely open the rear door of the vehicle 40 and loads luggage.

The controller 20 transmits information indicating the stop locations to the vehicles 40 and 41. The vehicle 40 stops at the far end position P1 based on the received information. The vehicle 41 stops at the position P2 based on the received information.

In FIG. 4, the scheduled departure order is calculated by adding the times required for boarding to the reservation times of the users 50 and 51, but no limitation is implied thereby. The scheduled departure order may be calculated by adding the times required for boarding to the times at which the vehicles 40 and 41 will arrive at the stopping area 70 (arrival times).

Next, another example of the stop location control method when there are two stop-scheduled vehicles will be described with reference to FIG. 5.

Figure 5:
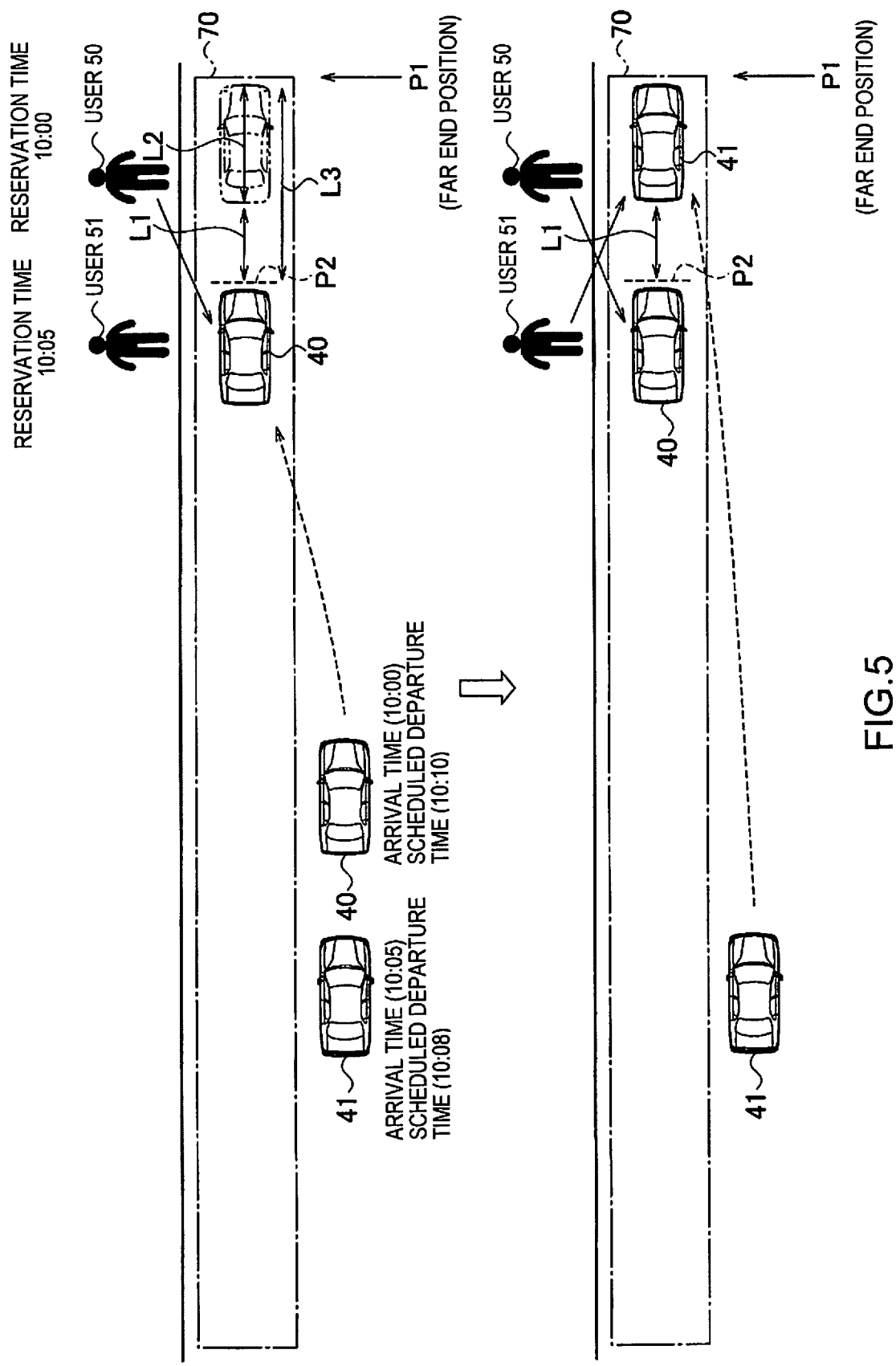
FIG. 5 is a diagram describing another example of the stop location control method according to the first embodiment of the present invention.

In the example shown in FIG. 5, unlike FIG. 4, the order of arrival at the stopping area 70 and the order of departure differ. That is, in FIG. 5, the vehicle 40 arrives at the stopping area 70 before the vehicle 41, but the vehicle 40 departs the stopping area 70 after the vehicle 41 departs. Descriptions equivalent to those in FIG. 4 will be omitted.

Upon receiving a signal indicating that the vehicles 40 and 41 have been extracted, the departure time calculation unit 216 calculates the scheduled departure times at which the vehicles 40 and 41 will depart the stopping area 70 after having stopped in the stopping area 70.

The departure time calculation unit 216 refers to the reservation information of the users 50 and 51, the user database 242, etc., to calculate the times required for the users 50 and 51 to board. In FIG. 5, the time required for the user 50 to board is calculated as 10 minutes. Therefore, by adding 10 minutes to 10:00, the scheduled departure time for the vehicle 40 is 10:10. Also, the time required for the user 51 to board is calculated to be 3 minutes. Therefore, by adding 3 minutes to 10:05, the scheduled departure time for the vehicle 41 is 10:08. Thus, in FIG. 5, the vehicle 40 departs the stopping area 70 after the vehicle 41 departs.

The scheduled departure times are arranged in chronological order by the departure time calculation unit 216 in order to calculate the scheduled departure order. In FIG. 5, the vehicle 40 is scheduled to depart second, and the vehicle 41 is scheduled to depart first. That is, the scheduled departure order is vehicle 41, then vehicle 40.

The stop location calculation unit 217 receives a signal indicating the scheduled departure order and calculates the stop locations of the vehicles 40 and 41 based on the received signal. The scheduled departure order of the vehicle 40 is second, and the vehicle 41 has not yet arrived. Thus, the stop location calculation unit 217 secures a space for the vehicle 41, arriving later, in which to stop, and calculates the stop location of the vehicle 40. Specifically, as shown in FIG. 5, the stop location calculation unit 217 calculates a position P2, which is separated from the far end position P1 by a distance L3, as the stop location of the vehicle 40. The distance L3 is the distance obtained by adding the distance L1 to a distance L2 equal to the total length of the vehicle 41. The reason the far end position P1 is used as a reference is because the vehicle 41 is scheduled to depart first.

Since the vehicle 41 is scheduled to depart first, the stop location calculation unit 217 calculates the far end position P1 of the stopping area 70 as the stop location of the vehicle 41.

The controller 20 transmits information indicating the stop locations to the vehicles 40 and 41. Based on the received information, the vehicle 40 stops at the position P2, as shown in FIG. 5. The vehicle 41 arrives at the stopping area 70 after the vehicle 40 has stopped in the position P2. Based on the received information, the vehicle 41 stops at the far end position P1.

Thus, according to the first embodiment, the stop locations are calculated to be in the order of departure from the stopping area 70, instead of the order of arrival to the stopping area 70. As a result, by means of the first embodiment, the stopping area 70 can be efficiently utilized, as opposed to the case of the conventional technology in which the vehicles make uncoordinated stops.

In FIG. 5, information pertaining to the total length of the vehicle 41 is necessary to calculate the position P2, and the stop location calculation unit 217 can refer to a database, or the like to acquire the information regarding the total length of the vehicle 41. Besides the vehicle total length, other information regarding the vehicle body can also be acquired by the stop location calculation unit 217. The stop location calculation unit 217 can also acquire, in addition to information related to the vehicle 41, information pertaining to other vehicles that may pertain to the first embodiment.

Next, another example of the stop location control method will be described with reference to FIG. 6.

Figure 6:
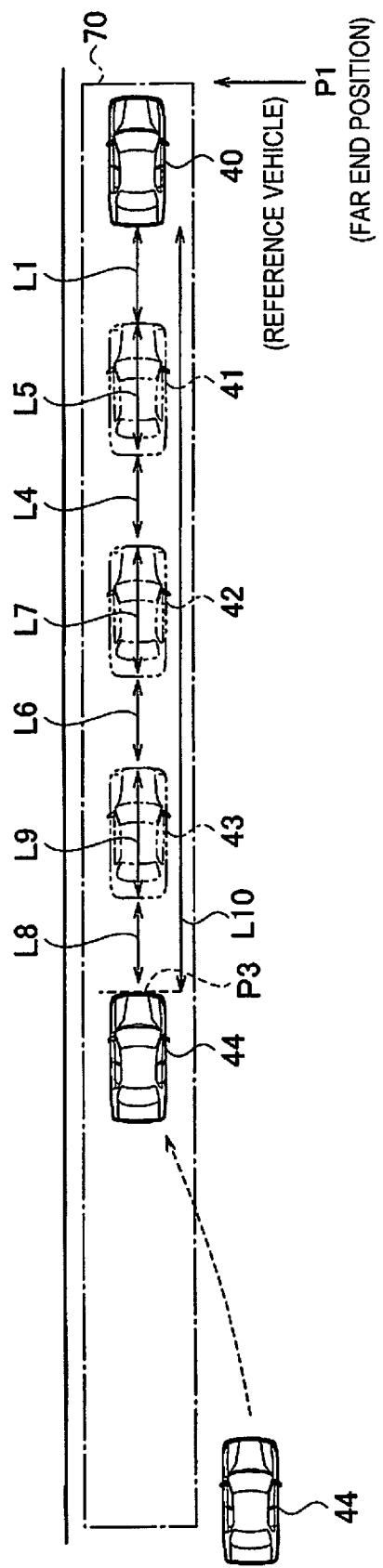
FIG. 6 is a diagram describing another example of the stop location control method according to the first embodiment of the present invention.

The scenario shown in FIG. 6 is a one in which the vehicle 40 has already stopped at the far end position P1 when a vehicle 44 arrives at the stopping area 70. Also, the vehicles 41, 42, and 43 have not yet arrived at the stopping area 70 when the vehicle 44 arrives at the stopping area 70, but the vehicles 41, 42, and 43 are scheduled to depart earlier than the vehicle 44.

In FIG. 6, the scheduled departure order is vehicle 40, vehicle 41, vehicle 42, vehicle 43, and vehicle 44. The stop location calculation unit 217 receives a signal indicating the scheduled departure order and calculates the stop location of the vehicle 44 based on the received signal. Because the vehicles 41, 42, 43 have not yet arrived at the stopping area 70, the stop location calculation unit 217 calculates the stop location of the vehicle 44 such that the vehicles 41, 42, 43 can stop in front of the vehicle 44. For example, as shown in FIG. 6, the stop location calculation unit 217 can calculate a position P3, which is separated from the vehicle 40 by a distance L10, as the stop location of the vehicle 44. In FIG. 6, the vehicle 40 is a vehicle that serves as a reference (hereinafter referred to as the reference vehicle) when the stop location is calculated.

The distance L10 is the distance obtained by adding distances L1, L4, L5, L6, L7, L8, and L9. The distance L5 is the total length of the vehicle 41. The distance L6 is the total length of the vehicle 42. The distance L9 is the total length of the vehicle 43. The distance L4 is a distance with which the vehicle 42 can depart while avoiding the vehicle

41. The distance L6 is a distance with which the vehicle 43 can depart while avoiding the vehicle 42. The distance L8 is a distance with which the vehicle 44 can depart while avoiding the vehicle 43.

Thus, the stop location calculation unit 217 calculates a location, which is separated from the reference vehicle by the distance L10, as the stop location. The controller 20 transmits information indicating the stop location to the vehicle 44. Based on the received information, the vehicle 44 stops at the position P3, as shown in FIG. 6. The vehicles 41, 42 and 43, which arrive at the stopping area 70 later, will thus be able to stop in the order of departure. In this way, in accordance with the first embodiment, the stop locations are calculated to be their order of departure from the stopping area 70, instead of their order of arrival to the stopping area 70. Thus, the stopping area 70 can be utilized efficiently.

Next, another example of the stop location control method will be described with reference to FIG. 7.

Figure 7:
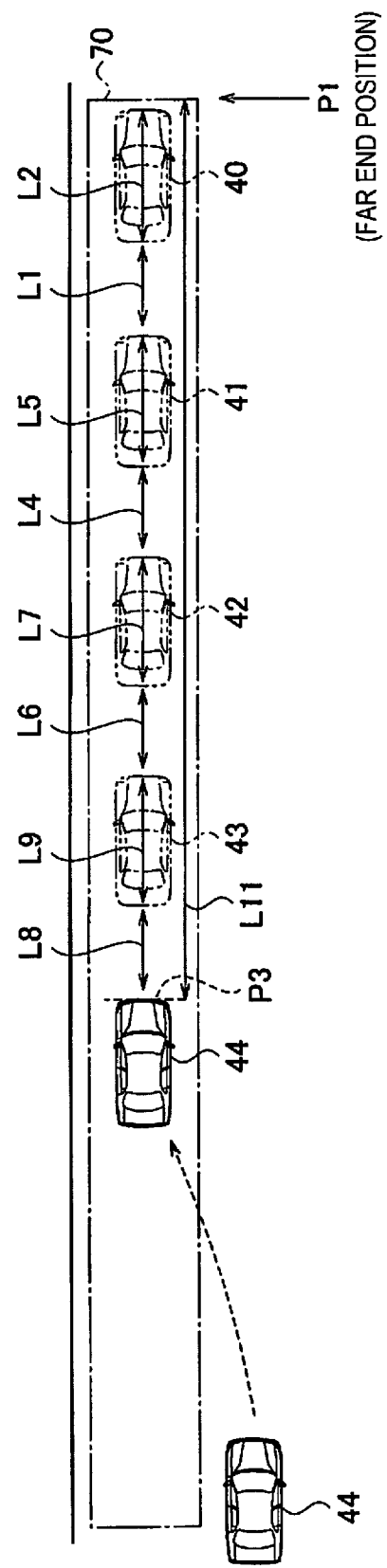
FIG. 7 is a diagram describing another example of the stop location control method according to the first embodiment of the present invention.

The scenario shown in FIG. 7 is one in which by the time that the vehicle 44 arrives at the stopping area 70, none of the other vehicles have yet arrived at the stopping area 70. That is, compared to the scenario of FIG. 6, in FIG. 7, the vehicle 40 (the reference vehicle) has not yet arrived at the stopping area 70.

As in FIG. 6, in FIG. 7, the scheduled departure order is in the order of the vehicle 40, the vehicle 41, the vehicle 42, the vehicle 43, and the vehicle 44. Since the vehicles 40, 41, 42, and 43 have not yet arrived at the stopping area 70, the stop location calculation unit 217 calculates the stop location of the vehicle 44 such that the vehicles 40, 41, 42, 43 can stop in front of the vehicle 44. For example, the stop location calculation unit 217 sets the far end position P1 as a reference position for calculating the stop location. As shown in FIG. 7, the stop location calculation unit 217 can calculate the position P3, which is separated from the reference position (far end position P1) by a distance L11, as the stop location of the vehicle 44.

The distance L11 is the distance obtained by adding the distances L1, L2, L4, L5, L6, L7, L8, and L9. If a reference vehicle, such as that shown in FIG. 6, is not present, the stop location calculation unit 217 can calculate the stop location using the far end position P1 as a reference.

The movement of the stop location will now be described with reference to FIG. 8.

Figure 8:
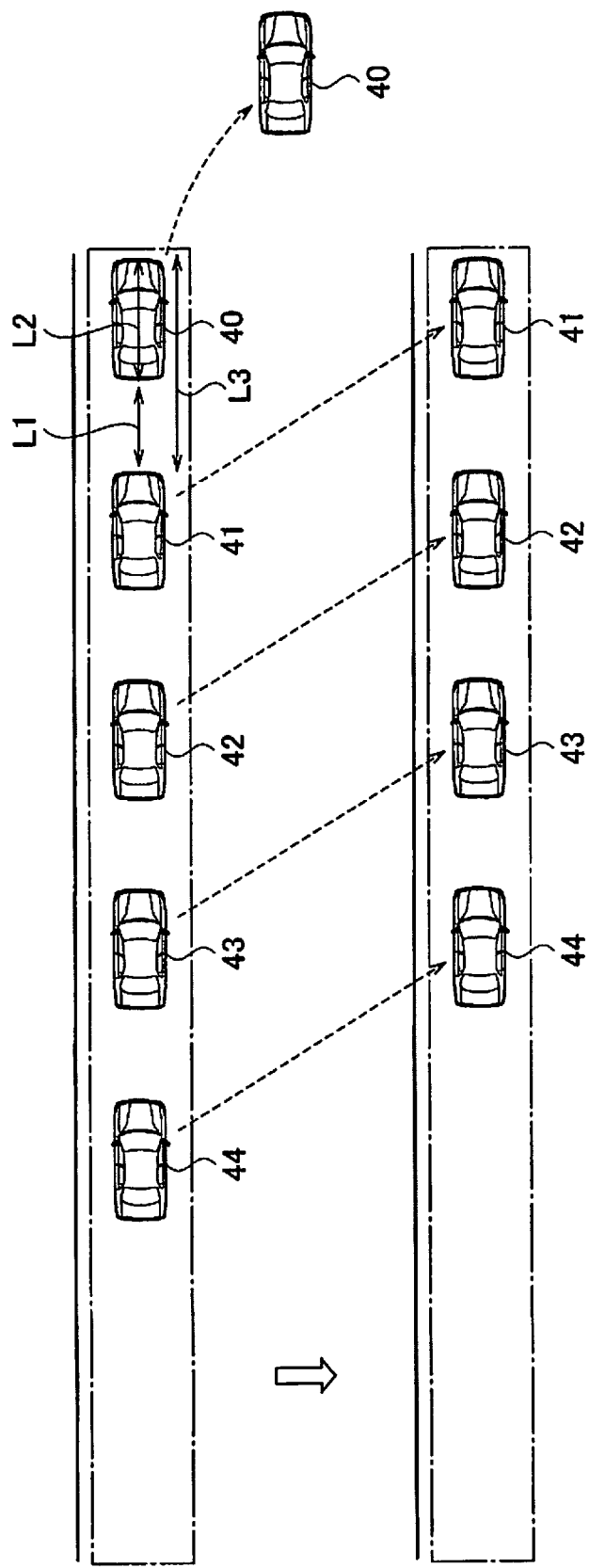
FIG. 8 is a diagram describing movement of the stop location.

As shown in FIG. 8, upon receiving a signal indicating that the vehicle 40, whose scheduled departure order is first, has departed, the stop location calculation unit 217 moves the stop locations of the vehicles 41 to 44 forward by the distance L3 (distance L1+L2). The vehicles 41 to 44 thus move forward by the distance L3. Thus, the stopping area 70 can be used efficiently.

Figure 9:
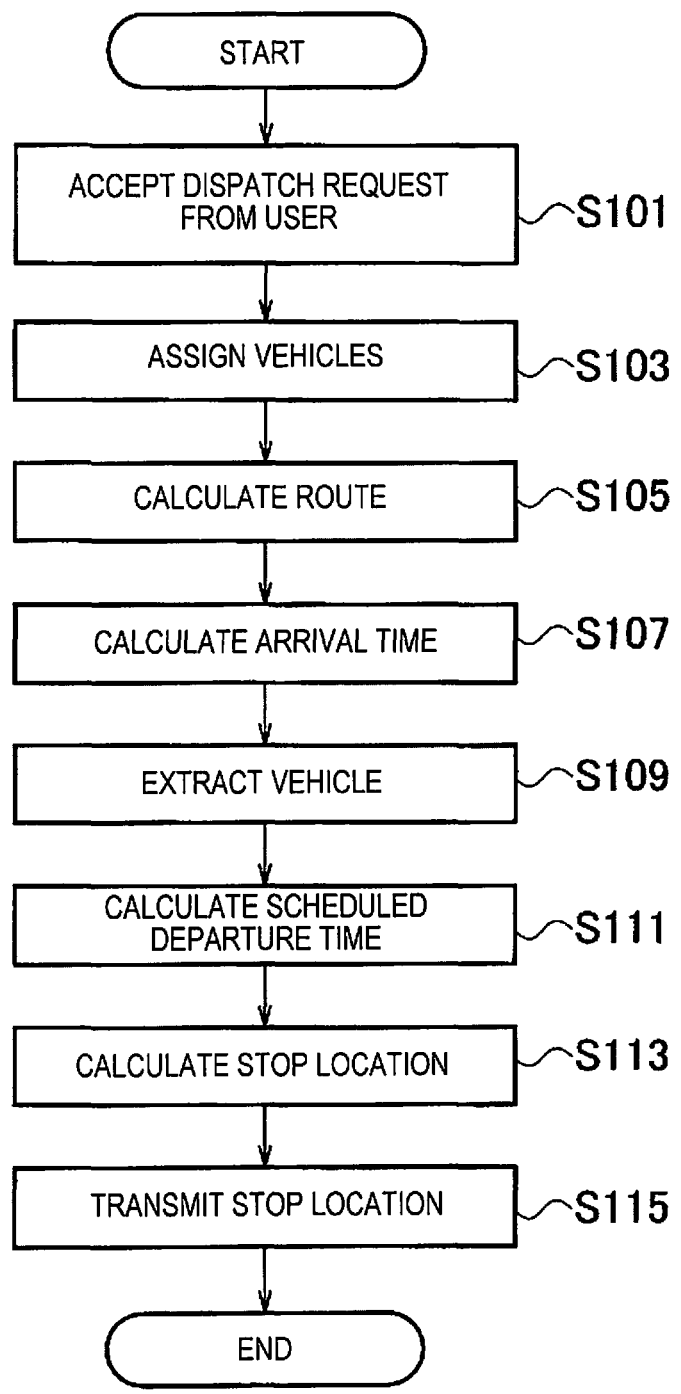
FIG. 9 is a flowchart describing an operation example of a controller according to the first embodiment of the present invention.

An operation example of the controller 20 will now be described with reference to the flowchart of FIG. 9.

In Step S101, the vehicle dispatch acceptance unit 211 accepts a user request via a terminal device in possession of the user. The process proceeds to Step S103, and, based on the accepted request, the assignment unit 212 assigns a suitable vehicle from among the plurality of vehicles. For example, if the user has specified the vehicle type, the assignment unit 212 assigns the specified vehicle type. Further, if the user has not specified the vehicle type, the assignment unit 212 can assign an unoccupied vehicle that is closest to the boarding location desired by the user.

The process proceeds to Step S105, and the route calculation unit 213 calculates a route from the current location of the vehicle to the boarding location desired by the user and sends an instruction to the vehicle to travel to the boarding location desired by the user via the calculated route. The process proceeds to Step S107, and the arrival time calculation unit 214 calculates the time at which the vehicle will arrive at the boarding location desired by the user.

The process proceeds to Step S109, and the extraction unit 215 refers to the reservation information of the user in order to extract the vehicle scheduled to stop in the stopping area. The process proceeds to Step S111, and upon receiving a signal indicating that the vehicle has been extracted, the departure time calculation unit 216 calculates the scheduled departure time at which the vehicle will depart the stopping area after having stopped in the stopping area. As one example, the scheduled departure time is calculated by adding the time required for boarding to the time at which the user will arrive at the stopping area. In addition to the scheduled departure time, a scheduled departure order indicating the order in which vehicles will depart the stopping area after having stopped in the stopping area is calculated by the departure time calculation unit 216. The scheduled departure order is obtained by arranging the scheduled departure times in chronological order.

The process proceeds to Step S113, in which the stop location calculation unit 217 receives a signal indicating the scheduled departure order and, based on the received signal, calculates the stop location of the vehicle. The process proceeds to Step S115, and the controller 20 transmits information indicating the stop location to the vehicle. Based on the received information, the vehicle stops at the stop location.

Figure 10:
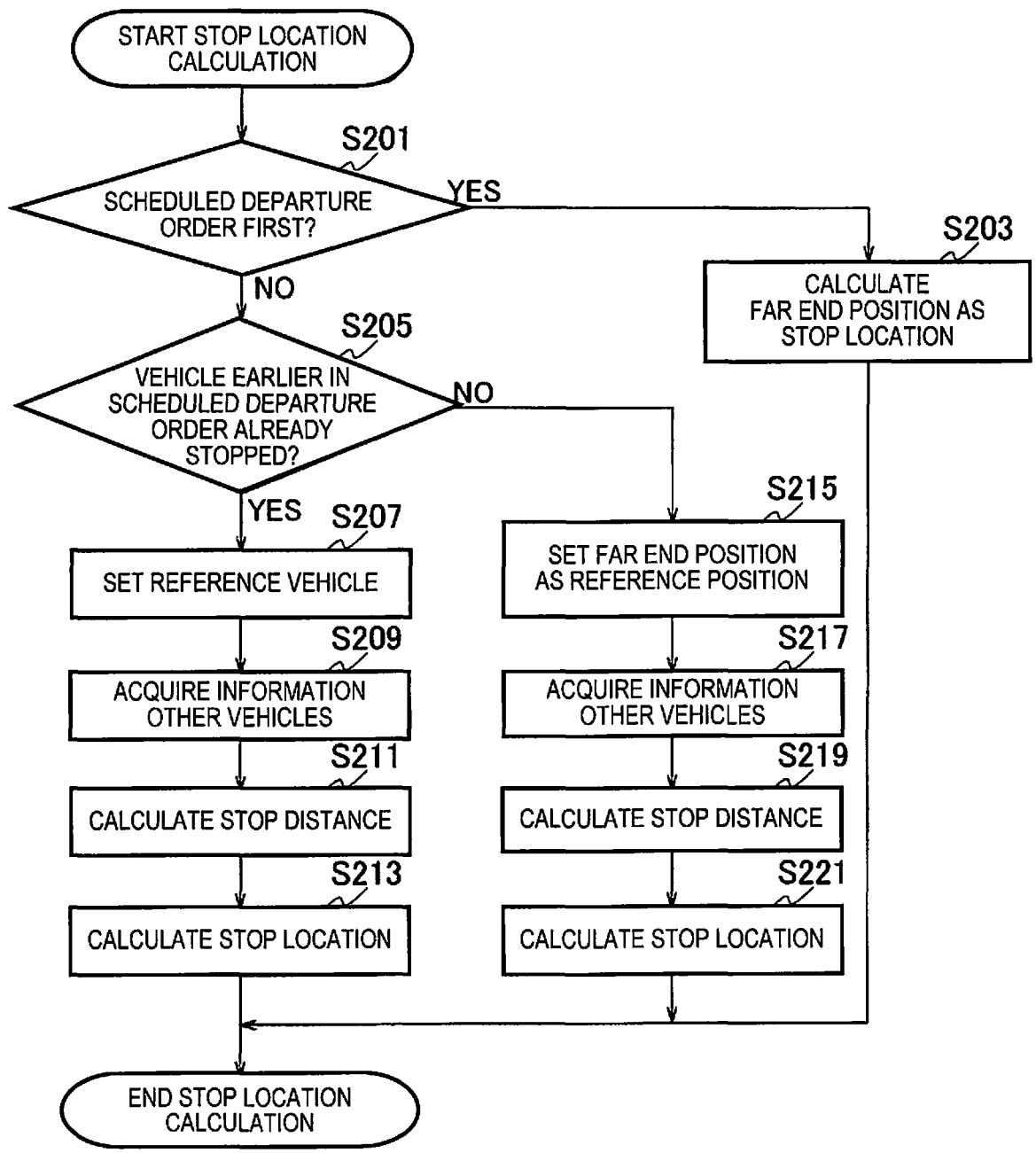
FIG. 10 is a flowchart describing an operation example of the controller according to the first embodiment of the present invention.

An operation example of the stop location calculation unit 217 will now be described with reference to the flowchart of FIG. 10. The flowchart of FIG. 10 describes Step S113 of FIG. 9 in detail.

If the vehicle that arrived at the stopping area is scheduled to depart first (YES in Step S201), the process proceeds to Step S203, and the stop location calculation unit 217 calculates the far end position of the stopping area as the stop location of the vehicle. More specifically, if, as shown in FIG. 4, the vehicle 40 that arrived at the stopping area 70 is scheduled to depart first, the stop location calculation unit 217 calculates the far end position P1 of the stopping area 70 as the stop location of the vehicle 40.

On the other hand, if the vehicle that arrived at the stopping area is not scheduled to depart first (NO in Step S201), the process proceeds to Step S205. If another vehicle that is scheduled to depart earlier has already stopped by the time the vehicle arrives at the stopping area (YES in Step S205), the process proceeds to Step S207. In Step S207, the stop location calculation unit 217 sets the vehicle that has already stopped as the reference vehicle for calculating the stop location. More specifically, as shown in FIG. 6, the stop location calculation unit 217 sets the vehicle 40 that has already stopped in the stopping area 70 as the reference vehicle for calculating the stop location of the vehicle 44. The process proceeds to Step S209, in which the stop location calculation unit 217 acquires information in regard to the other vehicles 41 to 43 (total length, etc.) (refer to FIG. 6).

The process proceeds to Step S211, and the stop location calculation unit 217 calculates the distances L4, L6, and L8, so that the vehicles 41 to 43, which will arrive at the stopping area 70 later, will be able to stop in the order of departure (refer to FIG. 6). The process proceeds to Step S213, and the stop location calculation unit 217 calculates the position P3, which is separated from the reference vehicle (the vehicle 40) by the distance L10, as the stop location of the vehicle 44 (refer to FIG. 6).

If another vehicle that is earlier in the scheduled departure order has not stopped by the time that the vehicle arrives at the stopping area (NO in Step S205), the process proceeds to Step S215. In Step S215, the stop location calculation unit 217 sets the far end position as the reference position for calculating the stop location. More specifically, as shown in FIG. 7, the stop location calculation unit 217 sets the far end position P1 as a reference position for calculating the stop location. The process proceeds to Step S217, in which the stop location calculation unit 217 acquires information in regard to the other vehicles 40 to 43 (the total length, etc.) (refer to FIG. 7).

The process proceeds to Step S219, and the stop location calculation unit 217 calculates the distances L1, L4, L6, and L8, so that the vehicles 40 to 43, which will arrive at the stopping area 70 later, will be able to stop in the order of departure (refer to FIG. 7). The process proceeds to Step S221, and the stop location calculation unit 217 calculates the position P3, which is separated from the reference position (the far end position P1) by the distance L11, as the stop location of the vehicle 44 (refer to FIG. 7).

Figure 11:
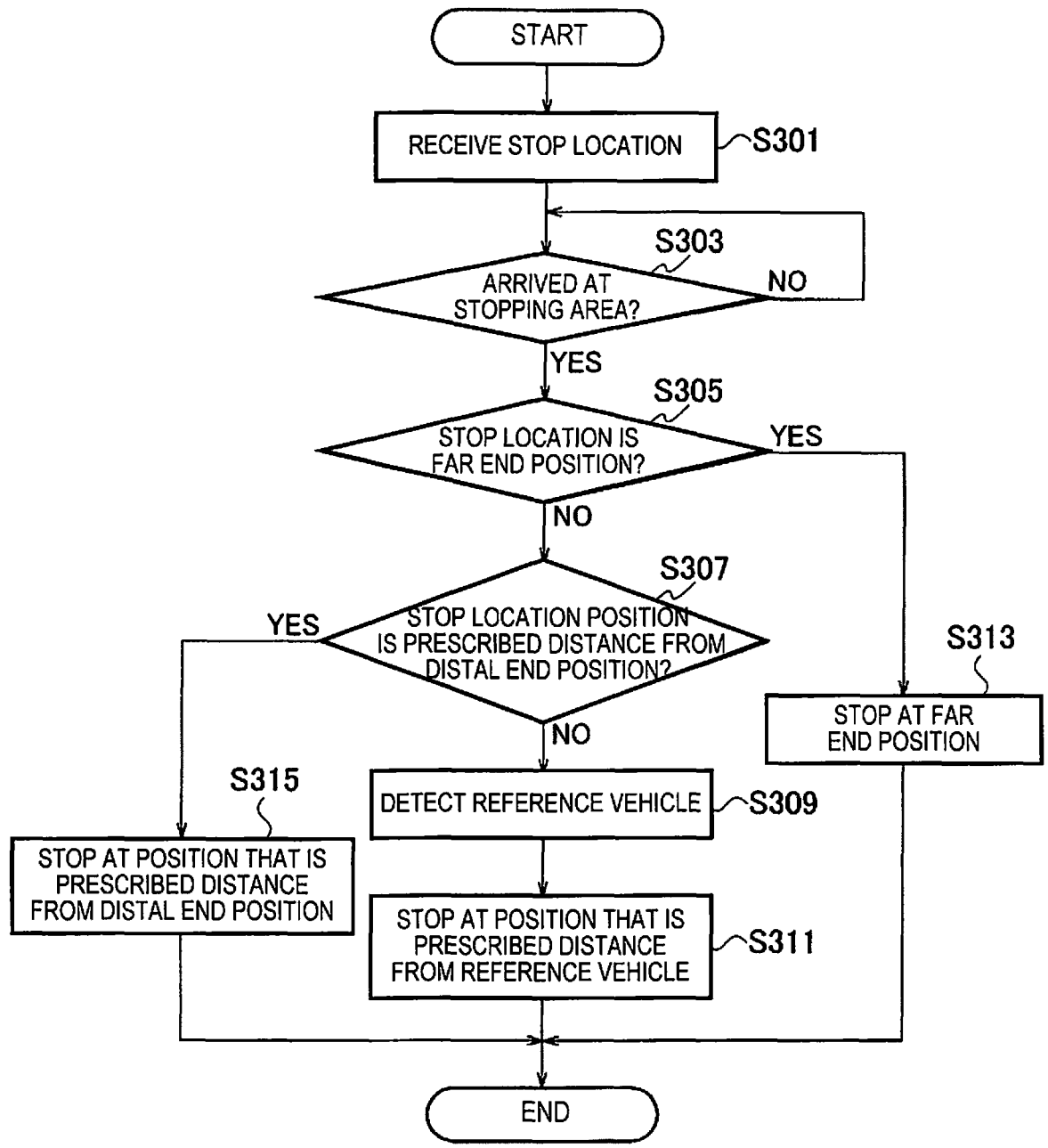
FIG. 11 is a flowchart describing an operation example of a vehicle according to the first embodiment of the present invention.

An operation example of the vehicle side will now be described with reference to the flowchart of FIG. 11.

In Step S301, the vehicle receives position information for stopping in the stopping area from the controller 20. The time at which the vehicle receives the position information is not particularly limited, but, in the flowchart, the time at which the vehicle receives the position information is before the vehicle arrives at the stopping area.

If the vehicle has arrived at the stopping area (YES in Step S303) and the stop location is the far end position (YES in Step S305), the vehicle stops at the far end position (Step S313). On the other hand, if the stop location is neither the far end position (NO in Step S305) nor a position separated from the far end position by a prescribed distance (NO in Step S307), the vehicle detects a reference vehicle (Step S309). Step S309 means that the distance L10, shown in FIG. 6, has been transmitted from the controller 20. That is, the stop location of the vehicle 44 (the position P3) is separated from the reference vehicle (the vehicle 40) by the distance L10. The reason that the vehicle 44 is to detect the reference vehicle (the vehicle 40) in Step S309 is to check whether the reference vehicle (the vehicle 40) has actually stopped. A camera, radar, etc., is used to detect the reference vehicle (the vehicle 40).

The process proceeds to Step S311, in which the vehicle 44 stops at the position P3, which is separated from the reference vehicle (the vehicle 40) by the distance L10 (refer to FIG. 6).

On the other hand, if the stop location is separated from the far end position by the prescribed distance (YES in Step S307), the vehicle 44 stops at the position P3, which is separated from the far end position P1 by the distance L11 (refer to FIG. 7).

An operation example of the controller 20 and the vehicle will now be described with reference to the flowcharts of FIGS. 12, 13.

Figure 12:
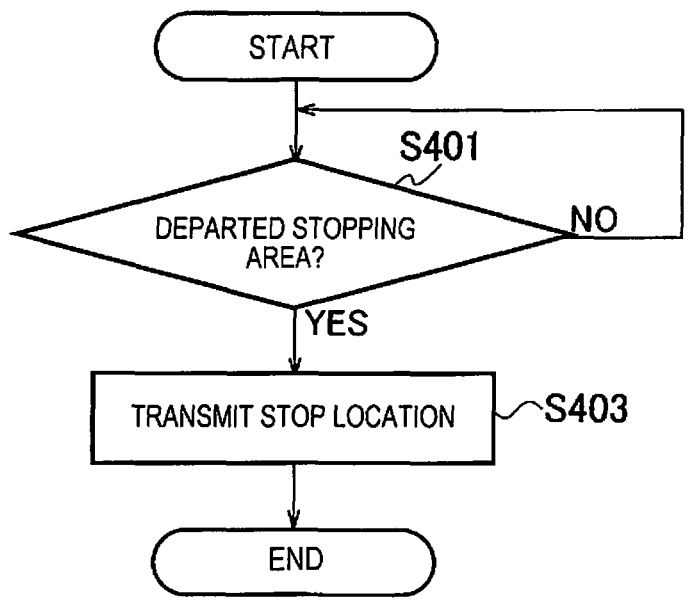
FIG. 12 is a flowchart describing an operation example of the controller according to the first embodiment of the present invention.

In Step S401 of FIG. 12, the controller 20 determines whether the vehicle has departed the stopping area. Position information of the vehicle, position information of the user boarding the vehicle, etc., are used for this determination. Alternatively, the controller 20 may receive from the vehicle a signal indicating its departure to make this determination.

If the vehicle has departed the stopping area (YES in Step S401), the controller 20 transmits a stop distance pertaining to the departed vehicle to other vehicles. More specifically, as shown in FIG. 8, the controller 20 transmits the distance L3 (distance L1+L2) to the other vehicles 41 to 44 that pertains to the departed vehicle 40.

Figure 13:
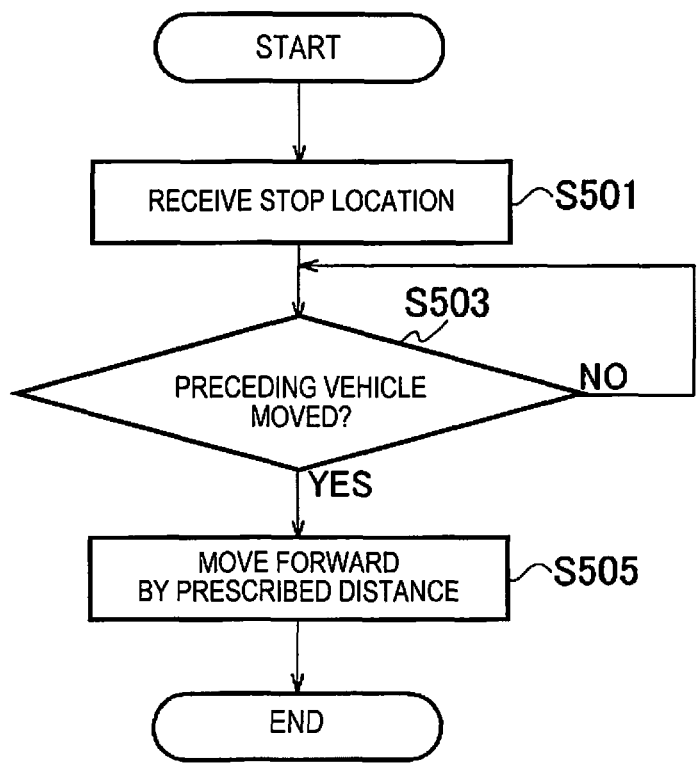
FIG. 13 is a flowchart describing an operation example of the vehicle according to the first embodiment of the present invention.

In Step S501 of FIG. 13, the vehicles 41 to 44 receive distance L3 from the controller 20. The vehicles 41 to 44 detect whether the preceding vehicle (vehicle 40 with respect to vehicle 41; the same applies in the following). If the preceding vehicle has moved (YES in Step S503), the vehicles 41 to 44 move forward by the distance L3 (Step S505, refer to FIG. 8).

Action and Effects

As described above, the following actions and effects can be achieved by means of the stop location control system 10 according to the first embodiment.

The extraction unit 215 extracts a plurality of the vehicles 40 and 41 (stop-scheduled vehicle), which are vehicles scheduled to stop in the stopping area 70 (refer to FIG. 5). The departure time calculation unit 216 calculates the scheduled departure order indicating the order in which the vehicles 40 and 41 will depart the stopping area 70 after having stopped in the stopping area 70, based on at least the reservation information pertaining to the vehicles 40 and 41 reserved by the users 50 and 51 and/or the arrival times at which the vehicles 40 and 41 will arrive at the stopping area 70. In the example shown in FIG. 5, the vehicle 41 is scheduled to depart first, and the vehicle 40 is scheduled to depart second. The stop location calculation unit 217 receives a signal indicating the scheduled departure order and calculates the stop locations of the vehicles 40 and 41 based on the received signal. In the example shown in FIG. 5, the stop location of the vehicle 40 is calculated as the position P2. The stop location of the vehicle 41 is calculated as the far end position P1. Thus, since the stop locations are calculated in the order of departure from the stopping area 70, stopping area 70 can be used efficiently.

Further, as shown in FIG. 5, the stop location (far end position P1) of the vehicle 41, which is earlier in the departure order, is calculated to be ahead of the stop location (position P2) of the vehicle 40, which is later in the scheduled departure order. Thus, since the stop locations are calculated in the order of departure from the stopping area 70, stopping area 70 can be used efficiently.

Further, when the users 50 and 51 board the vehicles 40 and 41 in the stopping area 70, the departure time calculation unit 216 may acquire the position information of the terminals (the terminal devices 60 and 61) in possession of the users 50 and 51. The departure time calculation unit 216 may then calculate the scheduled departure order based on the acquired position information. Combining the position information of the users 50 and 51 and walking speeds (movement speeds) of the users 50 and 51 makes it possible to obtain the time at which the users 50 and 51 will arrive at the stopping area 70. Some users may arrive at the stopping area 70 after the reservation time or arrive at the stopping area 70 before the reservation time. By taking the position information of the users into consideration, the arrival times of the users can be calculated accurately.

Further, when the users 50 and 51 board the vehicles 40 and 41 in the stopping area 70, the departure time calculation unit 216 may refer to the usage history (the user database 242) of the users 50 and 51 to acquire the movement speeds of the users 50 and 51 or trend information in regard to meeting the vehicles 40 and 41. Trend information pertaining to meeting the vehicles 40 and 41 indicates whether the user tends to arrive late or early to meet the vehicles. The departure time calculation unit 216 may calculate the scheduled departure order based on the acquired movement speeds or trend information. In this way, the scheduled departure order can be calculated accurately.

The stop location calculation unit 217 may use a rear opening/closing mechanism (trunk, rear door) of the vehicles 40 and 41, or the dimensions of the vehicles 40 and 41 (total length, turning radius, center-to-center distance between the front and rear wheels, etc.) to calculate the stop locations. As a result, the size of the parking space can be set in accordance with vehicle characteristics, and the stopping area 70 can be used efficiently.

The stop location calculation unit 217 may determine whether there is a reference vehicle 40 that has already stopped in the stopping area 70 by the time the vehicle 44 arrives at the stopping area 70. As shown in FIG. 6, if the reference vehicle 40 is already there and the vehicle 44 is earlier in the scheduled departure order, and the other vehicles 41 to 43, which are later in the scheduled departure order than the reference vehicle 40, have not yet arrived at the stopping area 70, the stop location calculation unit 217 may calculate the position P3, which is separated from the reference vehicle 40 by the distance L10, as the stop location of the vehicle 44, so that the other vehicles 41 to 43 will be able to stop. As a result, the stop locations are calculated in the order of departure from the stopping area 70, instead of the order of arrival at the stopping area 70. Thus, the stopping area 70 can be used efficiently.

Further, if other stop-scheduled vehicles, whose scheduled order of departure is between that of the stop-scheduled vehicle and the reference vehicle 40, have not yet arrived at the stopping area 70, the controller 20 may calculate a position which is separated from the reference vehicle 40 by a prescribed distance as the stop location of the stop-scheduled vehicle, such that the other stop-scheduled vehicles will be able to stop.

If the vehicle 40 (first stop-scheduled vehicle), whose scheduled departure order is first, departs the stopping area 70, as shown in FIG. 8, the stop location calculation unit 217 may move the stop location of the vehicle 42 (second stop-scheduled vehicle), whose scheduled departure order is second, forward. Further, the stop location calculation unit 217 may move the stop locations of the vehicles 43 and 44 forward in accordance with the movement of the vehicle 42. Thus, the stopping area 70 can be used efficiently.

The controller 20 controls the stop locations of a plurality of vehicles that stop in the stopping area to board and deboard users. The controller 20 acquires position information from a plurality of vehicles. The controller 20 acquires user-side information, including position information of the users that use the plurality of vehicles or reservation information pertaining to the vehicles reserved by the users. The controller 20 extracts from among the plurality of vehicles stop-scheduled vehicles, which are vehicles that are scheduled to stop in the stopping area. The controller 20 calculates the arrival times when the stop-scheduled vehicles will arrive at the stopping area based on at least the user-side information of the users who use the stop-scheduled vehicles, or on position information of the stop-scheduled vehicles. The controller 20 calculates, based on the arrival times and times required for boarding and deboarding, a scheduled departure order indicating the order in which the stop-scheduled vehicles are to depart the stopping area after having stopped in the stopping area. The controller 20 calculates the stop locations of the stop-scheduled vehicles based on the scheduled departure order. The controller 20 transmits information indicating the stop locations to the stop-scheduled vehicles. The user-side information includes information pertaining to reservations and information stored in the user database 242.

Second Embodiment

A second embodiment will be described next with reference to FIGS. 14 to 17. The second embodiment is different from the first embodiment in that a line of vehicles is formed in the stopping area 70. The same reference numerals have been used for configurations that are equivalent to those of the first embodiment, and their descriptions have been omitted. The following explanation emphasizes the differences. Reference numeral 70 has been omitted in FIGS. 14 to 17.

Figure 14:
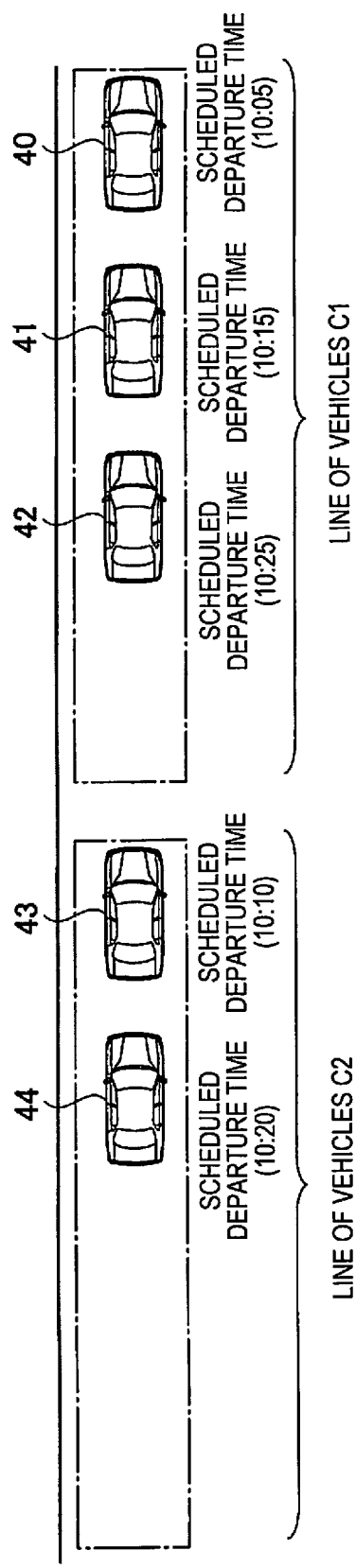
FIG. 14 is a diagram describing one example of the stop location control method according to a second embodiment of the present invention.

The line of vehicles pertaining to the second embodiment will be described with reference to FIG. 14. In the second embodiment, a row of vehicles are stopped in a line and face the same direction. As shown in FIG. 14, two lines of vehicles (lines of vehicles C1 and C2) are have formed in the stopping area 70.

The line of vehicles C1 includes the vehicles 40 to 42. The vehicles 40 to 42 are stopped in their order of departure from the stopping area 70. The line of vehicles C2 includes the vehicles 43 and 44. The vehicles 43 and 44 are stopped in their order of departure from the stopping area 70. In FIG. 14, since the scheduled departure time for the vehicle 43 is 10:10, it is desired that this vehicle stop between the vehicle 40 and the vehicle 41. However, depending on the user's reserved time, the extraction time by the extraction unit 215, etc., the vehicle 43 may not be able to stop between the vehicle 40 and the vehicle 41. One example of such a case is when the vehicle 40 and the vehicle 41 are stopped in the stopping area 70. In this case, the vehicles cannot stop in the order of departure in the line of vehicles C1. Thus, a new line of vehicles C2 is formed such that the scheduled order of departure for the vehicle 43 is first. The stop locations pertaining to the lines of the vehicles C1 and C2 are calculated by the stop location calculation unit 217.

Next, a case in which a new vehicle 45 arrives at the stopping area 70 after the lines of the vehicles C1 and C2 are formed will be described with reference to FIGS. 15-17.

Figure 15:
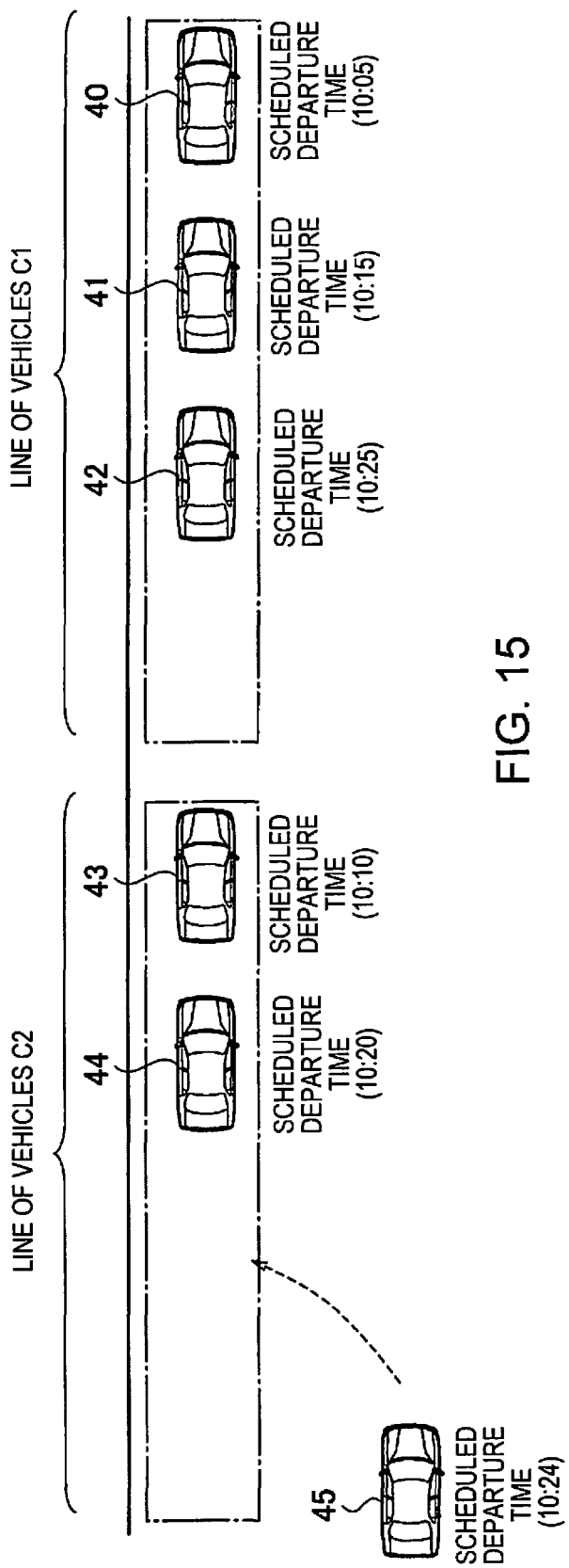
FIG. 15 is a diagram describing another example of the stop location control method according to the second embodiment of the present invention.

The scheduled departure time of the vehicle 45 shown in FIG. 15 has been calculated as 10:24. That is, the vehicle 45 departs before the vehicle 42 and after the vehicle 44. In this case, two stop locations of the vehicle 45 are conceivable. The two stop locations are between the vehicles 41 and 42, and behind the vehicle 44. However, because it is not possible to stop between the vehicles 41 and 42, as shown in FIG. 15, the stop location of the vehicle 45 is behind the vehicle 44. That is, in FIG. 15, a plurality of lines of vehicles are formed by the vehicles 40-44 that are already stopped in the stopping area 70 when the vehicle 45 arrives at the stopping area 70. More specifically, the vehicles 40 to 42 form the line of vehicles C1, and the vehicles 43-44 form the line of vehicles C2. In FIG. 15, the scheduled departure order of the vehicle 45 is before the vehicle 42 stopped at the end of the line of vehicles C1, and after the vehicle 44 stopped at the end of the line of vehicles C2. In this case, the stop location calculation unit 217 calculates the end of the line of vehicles C2 (i.e., behind the vehicle 44) as the stop location of the vehicle 45. Thus, the stopping area 70 can be used efficiently.

Figure 16:
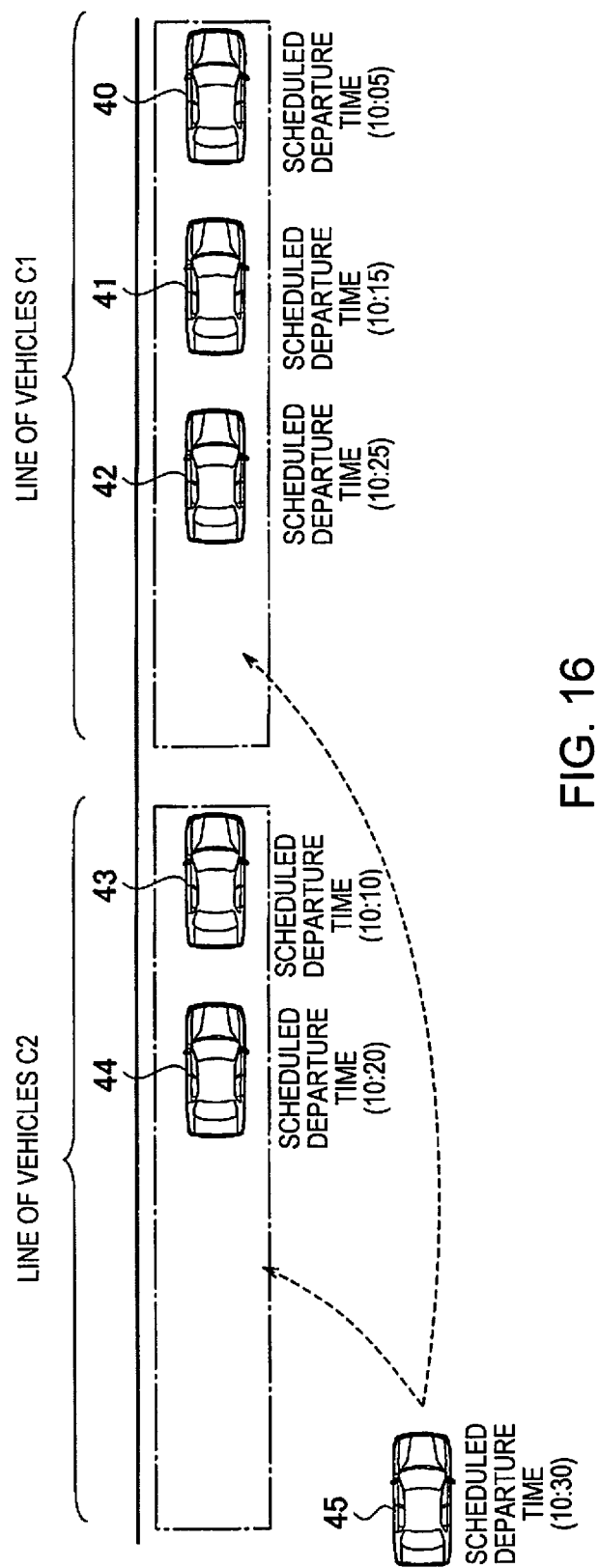
FIG. 16 is a diagram describing another example of the stop location control method according to the second embodiment of the present invention.

Next, the scheduled departure time of the vehicle 45 shown in FIG. 16 has been calculated as 10:30. In this case, the stop location of the vehicle 45 may be behind the vehicle 42 or behind the vehicle 44. That is, the lines of vehicles C1 and C2 in FIG. 16 are formed in the same way as in FIG. 15.

In FIG. 16, the scheduled departure order of the vehicle 45 is after the respective scheduled departure order of the vehicles (vehicles 42, 44) stopped at the end of a plurality of lines of vehicles (lines of vehicles C1 and C2). In this case, the stop location calculation unit 217 calculates the end of one of the lines of vehicles (i.e., behind the vehicle 42, or behind the vehicle 44) as the stop location of the vehicle 45. Thus, the stopping area 70 can be used efficiently.

Figure 17:
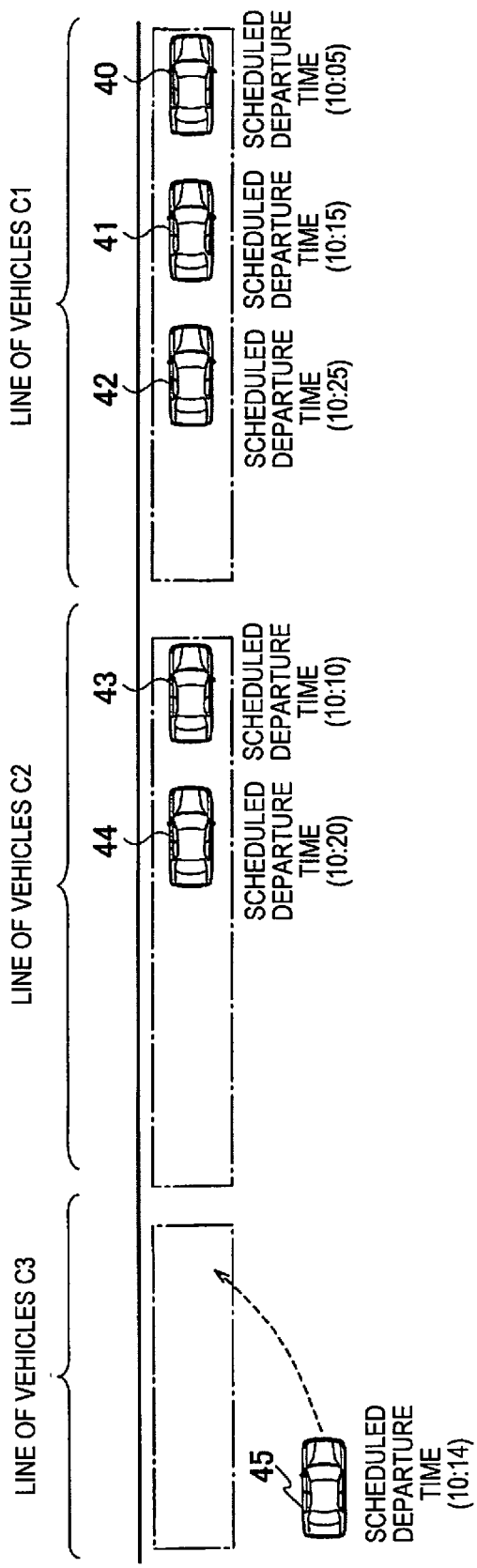
FIG. 17 is a diagram describing another example of the stop location control method according to the second embodiment of the present invention.

Next, the scheduled departure time of the vehicle 45 shown in FIG. 17 has been calculated as 10:14. In this case, two stop locations of the vehicle 45 are conceivable. The two stop locations are between the vehicle 40 and 41, and between the vehicles 43 and 44. However, as shown in FIG. 17, it is not possible to stop between the vehicles 40 and 41, or to stop between the vehicles 43 and 44. In this case, the stop location calculation unit 217 calculates a position separated from the lines of vehicles C1 and C2 by a prescribed distance as the stop location of the vehicle 45, and sets the calculated stop location as the lead position of a new line of vehicles C3. That is, the lines of vehicles C1 and C2 are formed in FIG. 17 in the same manner as in FIGS. 15 and 16. In FIG. 17, the scheduled departure of the vehicle 45 is before the respective scheduled departure of the vehicles (the vehicles 42 and 44) stopped at the end of a plurality of lines of vehicles (lines of vehicles C1 and C2). In this case, the stop location calculation unit 217 calculates a position separated from the plurality of lines of vehicles by a prescribed distance as the stop location of the vehicle 45, and sets the calculated stop location as the lead position of a new line of vehicles. Thus, the stopping area 70 can be used efficiently.

The same process can be applied when there is only one line of vehicles.

Each of the functions described in the embodiments above may be implemented by means of one or more processing circuits. The processing circuits include programmed processing devices, such as processing devices including electronic circuits. The processing circuits also include such devices as application-specific integrated circuits (ASIC) and electronic components arranged to execute the described functions.

Embodiments of the present invention have been described above, but the descriptions and figures that form part of this disclosure should not be understood as limiting the present invention. From this disclosure, various alternative embodiments, examples, and operating techniques should be apparent to those skilled in the art.

In the embodiments described above, an example in which users board vehicles in a stopping area is described, but the present invention can be applied to cases in which users deboard vehicles in the stopping area. In the case that users deboard vehicles in the stopping area, the departure time calculation unit 216 may acquire the number of users that deboard, or information pertaining to the users' luggage, to calculate the scheduled departure order based on the acquired number of people or the information pertaining to luggage. Thus, the stopping area 70 can be used efficiently even during deboarding. For example, by adding the time required for the user to deboard to the arrival time of the vehicle, the scheduled departure time can be calculated for the case of deboarding. Like the time required for boarding, the time required for deboarding increases as the number of people deboarding increases. Deboarding also requires more time as the amount of luggage, such as suitcases, increases, since removal of the luggage takes time. Deboarding also takes longer for a user using a wheelchair.

In the case that users deboard stop-scheduled vehicles in the stopping area, the controller 20 acquires the number of users that deboard, or information pertaining to the luggage of deboarding users, included in the user-side information. The controller 20 calculates the times required for boarding and deboarding based on the acquired number of people or information pertaining to luggage. The controller 20 calculates the scheduled departure order based on the arrival times of the stop-scheduled vehicles and the times required for boarding and deboarding.

In addition, if, of two vehicles whose stop locations are one behind the other, the vehicle whose stop location is in front arrives at the stopping area before the vehicle whose stop location is behind, the stop location calculation unit 217 may calculate the stop locations in the following manner. That is, the stop location calculation unit 217 may calculate the stop location of the vehicle whose stop location is behind, such that the distance (inter-vehicular distance) between the vehicle whose stop location is in front and the vehicle whose stop location is behind becomes small. A specific example will be described with reference to FIG. 18.

Figure 18:
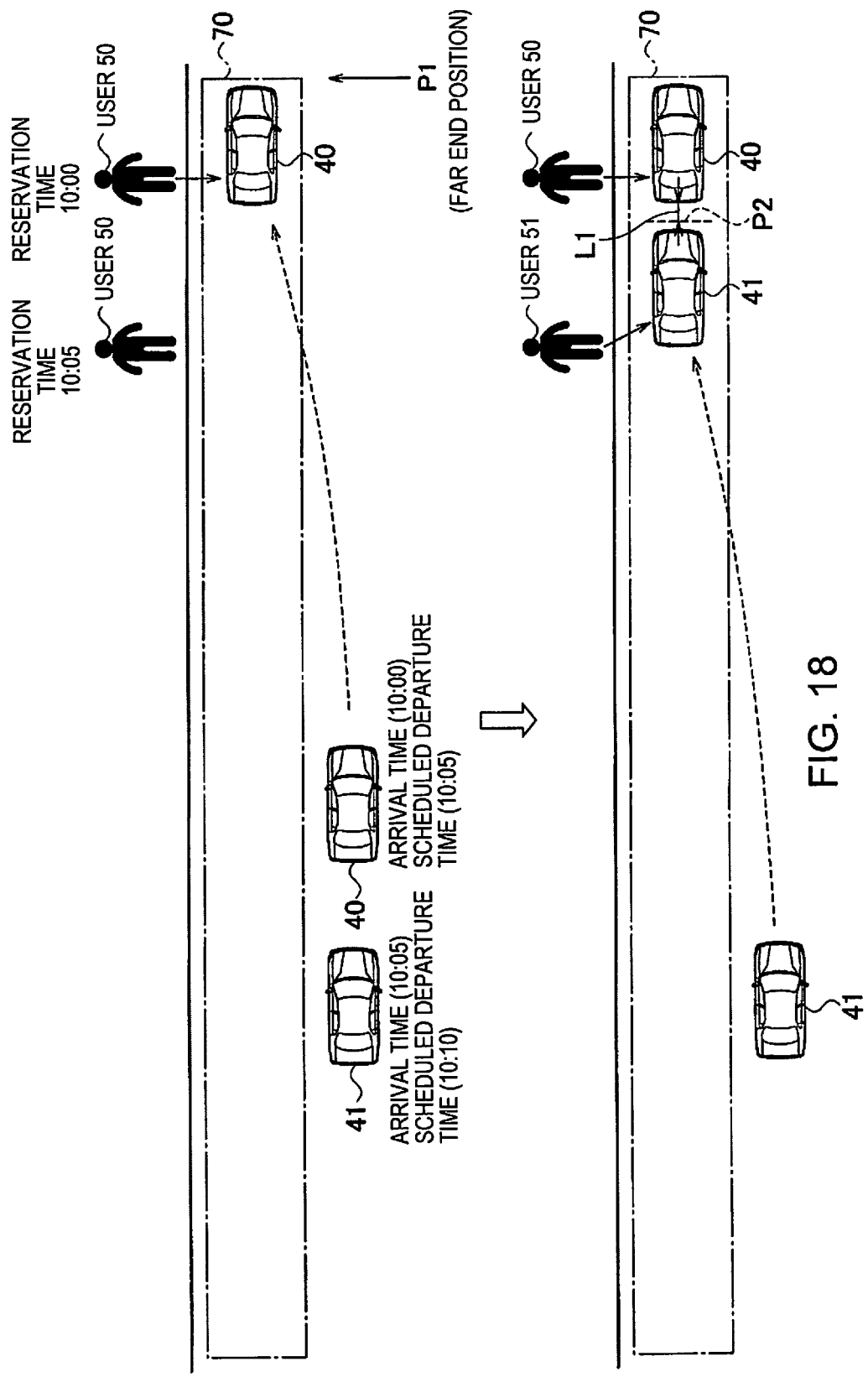
FIG. 18 is a diagram describing one example of the stop location control method according to another embodiment of the present invention.

In FIG. 18, the arrival time of the vehicle 40 is 10:00 and the arrival time of the vehicle 41 is 10:05. Further, the scheduled departure time of the vehicle 40 is 10:05, and the scheduled departure time of the vehicle 41 is 10:10. That is, the scheduled departure order is in the order of the vehicle 40 and the vehicle 41. Since the scheduled departure order of the vehicle 41 is after the scheduled departure order of the vehicle 40, the stop location calculation unit 217 calculates the stop location such that the stop location of the vehicle 41 is behind the vehicle 40. In FIG. 18, of two vehicles (vehicles 40 and 41) whose stop locations are one behind the other, the vehicle 40 whose stop location is in front arrives at the stopping area 70 before the vehicle 41 whose stop location is behind. In this case, the stop location calculation unit 217 may calculate the stop location (position P2) of the vehicle 41 whose stop location is behind, such that the distance (distance L1) between the vehicle 40 whose stop location is in front and the vehicle 41 whose stop location is behind becomes small. The reason for doing so is because it is known that the vehicle 40 will depart before the vehicle 41. By reducing the interval as shown in FIG. 18, the stopping area 70 can be used efficiently. The degree to which the distance is reduced is not particularly limited and may be smaller than a distance in which the rear door, or the like, as described in FIG. 4, is taken into consideration. The vehicle 41 may move forward to reduce the interval after checking, with a camera, or the like, that the user 50 has boarded the vehicle 40 in front. That the distance may be smaller means smaller compared with the case in which the vehicle 40 arrives at the stopping area 70 after the vehicle 41.

The invention claimed is:

1. A stop location control method using a controller for controlling stop locations of a plurality of vehicles that stop in a stopping area for allowing users to board/deboard, the stop location control method comprising:
the controller being configured to
acquire position information from the vehicles,
acquire user-side information including position information of the users who use the vehicles or reservation information pertaining to the vehicles reserved by the users,
extract stop-scheduled vehicles, which are scheduled to stop in the stopping area from among the vehicles,
calculate arrival times when the stop-scheduled vehicles will arrive at the stopping area based on the user-side information of the users who use the stop-scheduled vehicles, or based on position information of the stop-scheduled vehicles, calculate a scheduled departure order indicating an order in which the stop-scheduled vehicles will depart the stopping area after having stopped in the stopping area, calculate stop locations of the stop-scheduled vehicles based on the scheduled departure order, and transmit information indicating the stop locations to the stop-scheduled vehicles, of two stop-scheduled vehicles that occupy different positions in the order of departure, the stop-scheduled vehicle which is earlier in the scheduled order of departure being defined as a first stop-scheduled vehicle, and the stop-scheduled vehicle which is later in the scheduled order of departure being defined as a second stop-scheduled vehicle, and in a case where the first stop-scheduled vehicle arrives at the stopping area before the second stop-scheduled vehicle, the controller calculating the stop location of the second stop-scheduled vehicle such that the distance between the first stop-scheduled vehicle and the second stop-scheduled vehicle is smaller than in a case where the first stop-scheduled vehicle arrives at the stopping area later than the second stop-scheduled vehicle.

2. The stop location control method according to claim 1, wherein
the controller calculates the stop locations such that a stop location of the stop-scheduled vehicle which is earlier in the scheduled departure order comes before the stop locations of the plurality of vehicles which are later in the scheduled order of departure.

3. The stop location control method according to claim 1, wherein
the controller calculates the scheduled departure order based on the position information of the users, when the users board the stop-scheduled vehicles in the stopping area.

4. The stop location control method according to claim 1, wherein
the controller
refers to a usage history of the users included in the user-side information to acquire movement speeds of the users, or trend information regarding meetings with the stop-scheduled vehicles in the case that the users board the stop-scheduled vehicles in the stopping area, and
calculates the scheduled departure order based on the movement speeds or the trend information.

5. The stop location control method according to claim 1, wherein
the controller
acquires a number of users that deboard, or information pertaining to luggage of the users that deboard included in the user-side information,
calculates the times required for boarding and deboarding based on the number of people or the information pertaining to luggage, and
calculates the scheduled departure order based on the arrival times of the stop-scheduled vehicles and the times required for boarding and deboarding.

6. The stop location control method according to claim 1, wherein
the controller calculates the stop location using dimensions of a rear opening/closing mechanism of the stop-scheduled vehicle or dimensions of the stop-scheduled vehicle.

7. The stop location control method according to claim 1, wherein
the controller
determines whether a reference vehicle is present that has already stopped in the stopping area when the stop-scheduled vehicle arrives at the stopping area, and
calculates a position that is a prescribed distance away from the reference vehicle as the stop location of the stop-scheduled vehicle such that other stop-scheduled vehicles can stop upon determining the reference vehicle is present and upon determining the other stop-scheduled vehicles having the scheduled departure order between that of the stop-scheduled vehicle and the reference vehicle have not yet arrived at a stopping area.

8. The stop location control method according to claim 1, wherein
upon determining the stop-scheduled vehicle having the stop location that is in front departs the stopping area, the stop location of the stop-scheduled vehicle having the stop location behind is moved forward by the controller.

9. The stop location control method according to claim 1, wherein
the controller
if at least one line of vehicles is formed by vehicles already stopped in the stopping area when the stop-scheduled vehicle arrives at the stopping area and a vehicle stopped at the end of the line of vehicles is earlier in the scheduled order of departure than the scheduled departure order of the stop-scheduled vehicle, calculates a position behind the vehicle stopped at the end of the line of vehicles as the stop location of the stop-scheduled vehicle, and
if the vehicle stopped at the end of the line of vehicles is later in the scheduled order of departure than the stop-scheduled vehicle is in the scheduled order of departure, calculates a position separated from the line of vehicles by a prescribed distance as the stop location of the stop-scheduled vehicle, and sets the calculated stop location as the lead position of a new line of vehicles.

10. The stop location control method according to claim 1, wherein
the scheduled departure order is calculated based on the arrival times and times required for boarding and deboarding.

11. The stop location control method according to claim 1, further comprising
determining whether a reference vehicle has already stopped in the stopping area when the stop-scheduled vehicle arrives at the stopping area, and
calculating the stop location of the stop-scheduled vehicle based on whether or not the reference vehicle is present and on the scheduled departure order.

12. The stop location control method according to claim 1, further comprising
acquiring a number of the users that board or information pertaining to luggage of the users that is included in the user-side information, and
calculating a time required for the users to board and deboard based on the number of users or the information pertaining to luggage, and wherein the scheduled departure order is calculated based on the arrival times and times required for boarding and deboarding.

13. A stop location control device comprising:
a controller configured to control stop locations of a plurality of vehicles that stop in a stopping area for allowing users to board and deboard, wherein
the controller is further configured to
acquire position information from the vehicles,
acquire user-side information including position information of the users who use the vehicles or reservation information pertaining to the vehicles reserved by the users,
extract stop-scheduled vehicles, which are scheduled to stop in the stopping area from among the vehicles,
calculate arrival times when the stop-scheduled vehicles will arrive at the stopping area based on the user-side information of the users who use the stop-scheduled vehicles, or based on position information of the stop-scheduled vehicles,
calculate a scheduled departure order indicating an order in which the stop-scheduled vehicles will depart the stopping area after having stopped in the stopping area,
calculate stop locations of the stop-scheduled vehicles based on the scheduled departure order, and
transmit information indicating the stop locations to the stop-scheduled vehicles,
of two stop-scheduled vehicles that occupy different positions in the order of departure, the stop-scheduled vehicle which is earlier in the scheduled order of departure being defined as a first stop-scheduled vehicle, and the stop-scheduled vehicle which is later in the scheduled order of departure being defined as a second stop-scheduled vehicle, and
in a case where the first stop-scheduled vehicle arrives at the stopping area before the second stop-scheduled vehicle, the controller calculating the stop location of the second stop-scheduled vehicle such that the distance between the first stop-scheduled vehicle and the second stop-scheduled vehicle is smaller than in a case where the first stop-scheduled vehicle arrives at the stopping area later than the second stop-scheduled vehicle.

14. A stop location control system for controlling stop locations of a plurality of vehicles that stop in a stopping area for allowing users to board and deboard, the stop location control system comprising:
a terminal possessed by the user; and
a controller configured to communicate with the vehicle, wherein
the controller is further configured to
acquire position information from the vehicles,
acquire user-side information including position information of the users who use the vehicles or reservation information pertaining to the vehicles reserved by the users,
extract stop-scheduled vehicles, which are scheduled to stop in the stopping area from among the vehicles,
calculate arrival times when the stop-scheduled vehicles will arrive at the stopping area based on the user-side information of the users who use the stop-scheduled vehicles, or based on position information of the stop-scheduled vehicles,
calculate a scheduled departure order indicating an order in which the stop-scheduled vehicles will depart the stopping area after having stopped in the stopping area,
calculate stop locations of the stop-scheduled vehicles based on the scheduled departure order, and
transmit information indicating the stop locations to the stop-scheduled vehicles,
of two stop-scheduled vehicles that occupy different positions in the order of departure, the stop-scheduled vehicle which is earlier in the scheduled order of departure being defined as a first stop-scheduled vehicle, and the stop-scheduled vehicle which is later in the scheduled order of departure being defined as a second stop-scheduled vehicle, and
in a case where the first stop-scheduled vehicle arrives at the stopping area before the second stop-scheduled vehicle, the stop location of the second stop-scheduled vehicle being calculated such that the distance between the first stop-scheduled vehicle and the second stop-scheduled vehicle is smaller than in a case where the first stop-scheduled vehicle arrives at the stopping area later than the second stop-scheduled vehicle.

* * * * *